United States Patent
Zhou et al.

(10) Patent No.: US 12,127,238 B2
(45) Date of Patent: Oct. 22, 2024

(54) QUASI-COLOCATION PRIORITIZATION FOR SECONDARY CELL GROUP CHANGE WITH DIFFERENT NUMEROLOGY OR ASYNCHRONIZATION

(71) Applicant: QUALCOMM Incorporated, San Diego, CA (US)

(72) Inventors: Yan Zhou, San Diego, CA (US); Tao Luo, San Diego, CA (US); Olufunmilola Omolade Awoniyi-Oteri, San Diego, CA (US); Hung Dinh Ly, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 17/013,025

(22) Filed: Sep. 4, 2020

(65) Prior Publication Data

US 2021/0076395 A1    Mar. 11, 2021

Related U.S. Application Data

(60) Provisional application No. 62/897,967, filed on Sep. 9, 2019.

(51) Int. Cl.
*H04W 72/56*    (2023.01)
*H04W 72/044*    (2023.01)
*H04W 76/15*    (2018.01)

(52) U.S. Cl.
CPC ......... *H04W 72/56* (2023.01); *H04W 72/046* (2013.01); *H04W 76/15* (2018.02)

(58) Field of Classification Search
CPC .... H04W 72/046; H04W 72/10; H04W 76/15
(Continued)

(56) References Cited

U.S. PATENT DOCUMENTS 8,989,121 B2    3/2015    Luo et al.
2015/0181476 A1*    6/2015    Yang ............... H04W 16/14
                                                            455/454
(Continued)

FOREIGN PATENT DOCUMENTS

CN    106134263 A    11/2016
WO    2013066935 A1    5/2013
(Continued)

OTHER PUBLICATIONS

International Search Report and Written Opinion—PCT/US2020/049743—ISA/EPO—dated Dec. 11, 2020.

*Primary Examiner* — Kevin M Burd
(74) *Attorney, Agent, or Firm* — Procopio, Cory, Hargreaves & Savitch LLP

(57) ABSTRACT

Aspects are provided which allow a first wireless device such as a UE or base station to prioritize beams which are simultaneously received from or transmitted to cells of different numerologies or which are asynchronous to each other. The device determines an overlap in time between a first signal from a first cell and a second signal from a second cell, where the second cell includes at least one of a different numerology than the first cell or an asynchronous timing relative to the first cell. The device applies a beam prioritization rule for selecting a beam associated with the first signal or the second signal carrying information in separate beams. The device transmits information to or receives information from a second wireless device based on the selected beam. Thus, simultaneous beam conflict resolution may be improved for cells having different numerologies or asynchronous timing.

23 Claims, 13 Drawing Sheets

(58) Field of Classification Search
USPC .......................................................... 375/267
See application file for complete search history.

(56) References Cited

U.S. PATENT DOCUMENTS

| | | |
|---|---|---|
| 2018/0279150 A1 | 9/2018 | He et al. |
| 2019/0199571 A1 | 6/2019 | John Wilson et al. |
| 2020/0067673 A1* | 2/2020 | Luo ........................ H04L 5/0051 |
| 2020/0205142 A1* | 6/2020 | Gao ........................ H04L 5/0053 |
| 2020/0259547 A1* | 8/2020 | Castaneda .............. H04L 5/0048 |
| 2021/0315041 A1* | 10/2021 | Matsumura ....... H04W 72/0413 |

FOREIGN PATENT DOCUMENTS

| | | |
|---|---|---|
| WO | 2015116866 A1 | 8/2015 |
| WO | 2019081047 A1 | 5/2019 |

\* cited by examiner

QUASI-COLOCATION PRIORITIZATION FOR SECONDARY CELL GROUP CHANGE WITH DIFFERENT NUMEROLOGY OR ASYNCHRONIZATION

CROSS REFERENCE TO RELATED APPLICATION(S)

This application claims the benefit of U.S. Provisional Application Ser. No. 62/897,967, entitled "QUASI-COLOCATION PRIORITIZATION FOR SECONDARY CELL GROUP CHANGE WITH DIFFERENT NUMEROLOGY OR ASYNCHRONIZATION" and filed on Sep. 9, 2019, which is expressly incorporated by reference herein in its entirety.

BACKGROUND

Technical Field

The present disclosure relates generally to communication systems, and more particularly, to a wireless communication system between a user equipment (UE) and a base station.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

When a UE is simultaneously connected to multiple cells (e.g. in carrier aggregation, or during a make-before-break handover), the UE may simultaneously receive downlink signals in separate beams from the base stations in the multiple cells. Thus, the UE and base station(s) may determine an overlap in time between the downlink channels from each cell. In such cases, the UE and base station(s) prioritize the beams of the multiple cells according to one or more beam prioritization rules (described infra), and determine which beam corresponding to one of the cells to select for reception or transmission. The UE and base station(s) may prioritize/select each beam on a per symbol basis, i.e. as the UE monitors each symbol for each cell. However, when the different cells have different numerologies or are asynchronous in time, their symbol durations may be different or their symbol boundaries may not be aligned. Aspects presented herein provide beam prioritization rules that address beam conflict resolution for cells having different numerologies and/or asynchronous timing. For example, when the cells have different numerologies, aspects presented herein enable the UE and base station(s) to determine a beam to have priority on a per symbol basis based on a particular cell. Similarly, when the cells are asynchronous to each other with misaligned symbol boundaries, aspects presented herein enable a UE and base station(s) to determine a cell to serve as the timing reference for the UE and base station(s) to determine the prioritized beam on a per symbol basis.

The present disclosure allows a UE and base station(s) to prioritize beams which are simultaneously received from or transmitted to cells of different numerologies or which are asynchronous to each other according to various aspects. In one aspect where the UE is simultaneously connected to multiple cells with different numerologies, the UE and base station(s) may apply a beam prioritization rule to determine a beam of one of the cells on a per symbol basis with respect to a preconfigured cell or an indicated cell. In one example, the UE and base station(s) may apply a beam prioritization rule to determine beams based on the cell having the shorter symbol duration. In another example, the UE and base station(s) may apply a beam prioritization rule to determine beams based on a cell indicated in a message from a base station. In another aspect where the UE is simultaneously connected to multiple cells which are asynchronous to each other, the UE and base station(s) may apply a beam prioritization rule to determine a beam of one of the cells on a per symbol boundary basis with respect to a fixed, preconfigured cell or indicated cell. In a further aspect, the UE and base station(s) may apply a beam prioritization rule to determine beams on a per symbol boundary basis with respect to a cell from which the latest downlink communication was received or the latest uplink communication was transmitted.

In an additional aspect, when the UE and base station(s) determines to receive a beam from or transmit a beam to one of the first cell or the second cell as described above, the UE may further feedback to the base station a timing difference between receiving the beams from the cells or transmitting the beams to the cells. The base station may subsequently determine the successfully (or unsuccessfully) transmitted/received beam based on the timing difference. In an alternative aspect, the UE and base station(s) may only apply a beam prioritization rule to determine beams after completing reception or transmission of a continuous transmission having a same known beam indication, rather than on a per symbol or per symbol boundary basis. Alternatively, the UE may be restricted from simultaneously connecting to cells which have different symbol durations or misaligned symbol boundaries (e.g. based on a beam prioritization rule or by the base station). In this way, simultaneous beam conflict resolution may be improved for cells having different numerologies or which are asynchronous to each other.

In an aspect of the disclosure, a method, a computer-readable medium, and an apparatus are provided. The apparatus may be a first wireless device, such as a UE or a base station. The apparatus determines an overlap in time between a first signal for a first cell and a second signal for a second cell, where the second cell includes at least one of a different numerology than the first cell or an asynchronous timing relative to the first cell. The apparatus applies a beam prioritization rule for selecting a beam associated with the first signal of the first cell or the second signal of the second cell carrying information in separate beams. The apparatus transmits information to a second wireless device (such as a base station or a UE) or receives information from the second wireless device based on the selected beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
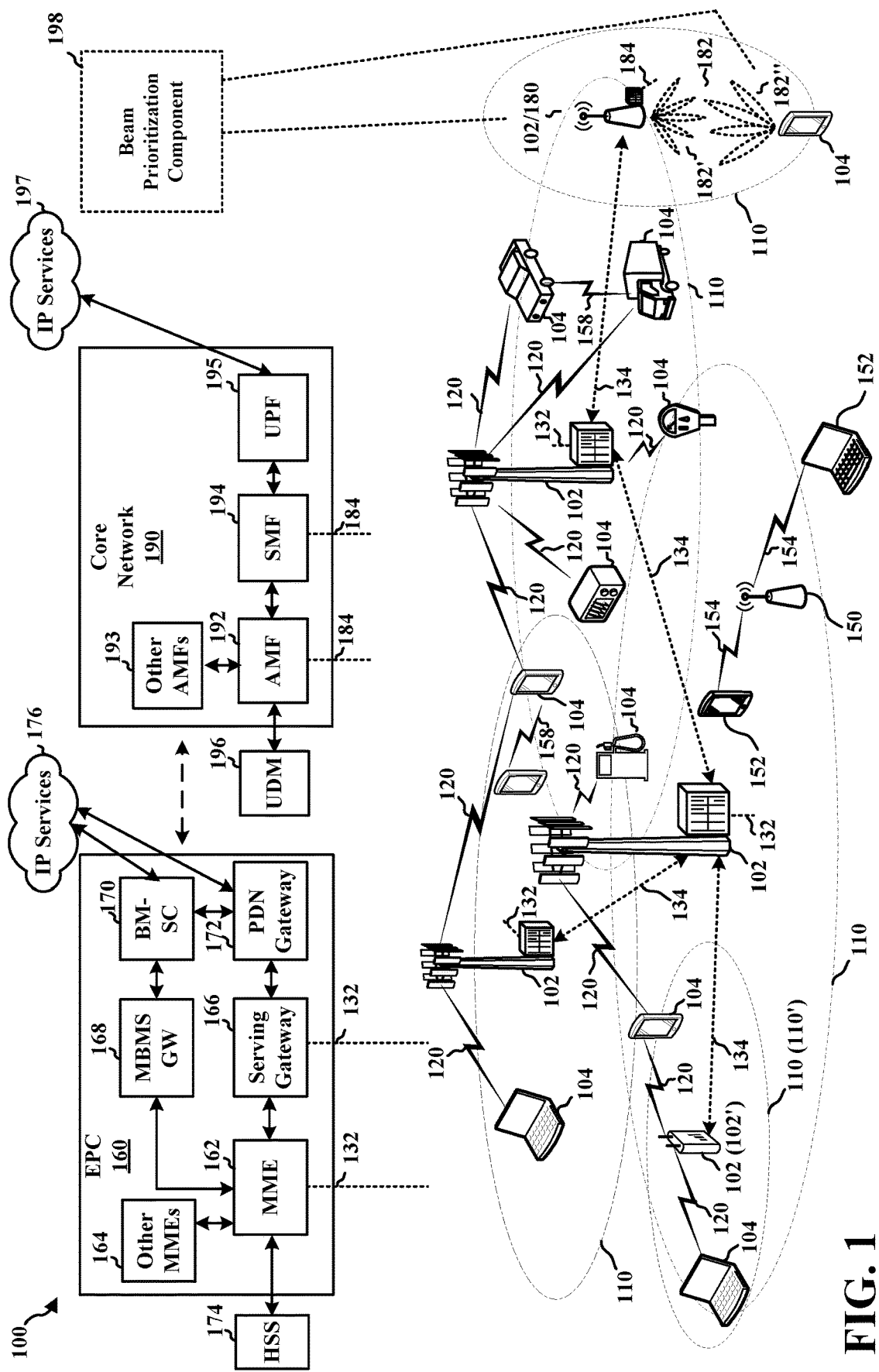
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 10. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and base station 180 may each include a beam prioritization component 198. The beam prioritization component 198 may be configured to determine an overlap in time between a first signal for a first cell and a second signal for a second cell, wherein the second cell includes at least one of a different numerology than the first cell or an asynchronous timing relative to the first cell. The beam prioritization component 198 may be configured to apply a beam prioritization rule for selecting a beam associated with the first signal of the first cell or the second signal of the second cell carrying information in separate beams. The beam prioritization component 198 may be configured to transmit information to another wireless device (e.g. the other of the UE and the base station) or receive information from the other wireless device based on the selected beam. Although the following description may be focused on 5G NR, the concepts described herein may be applicable to other similar areas, such as LTE, LTE-A, CDMA, GSM, and other wireless technologies.

Figure 2:
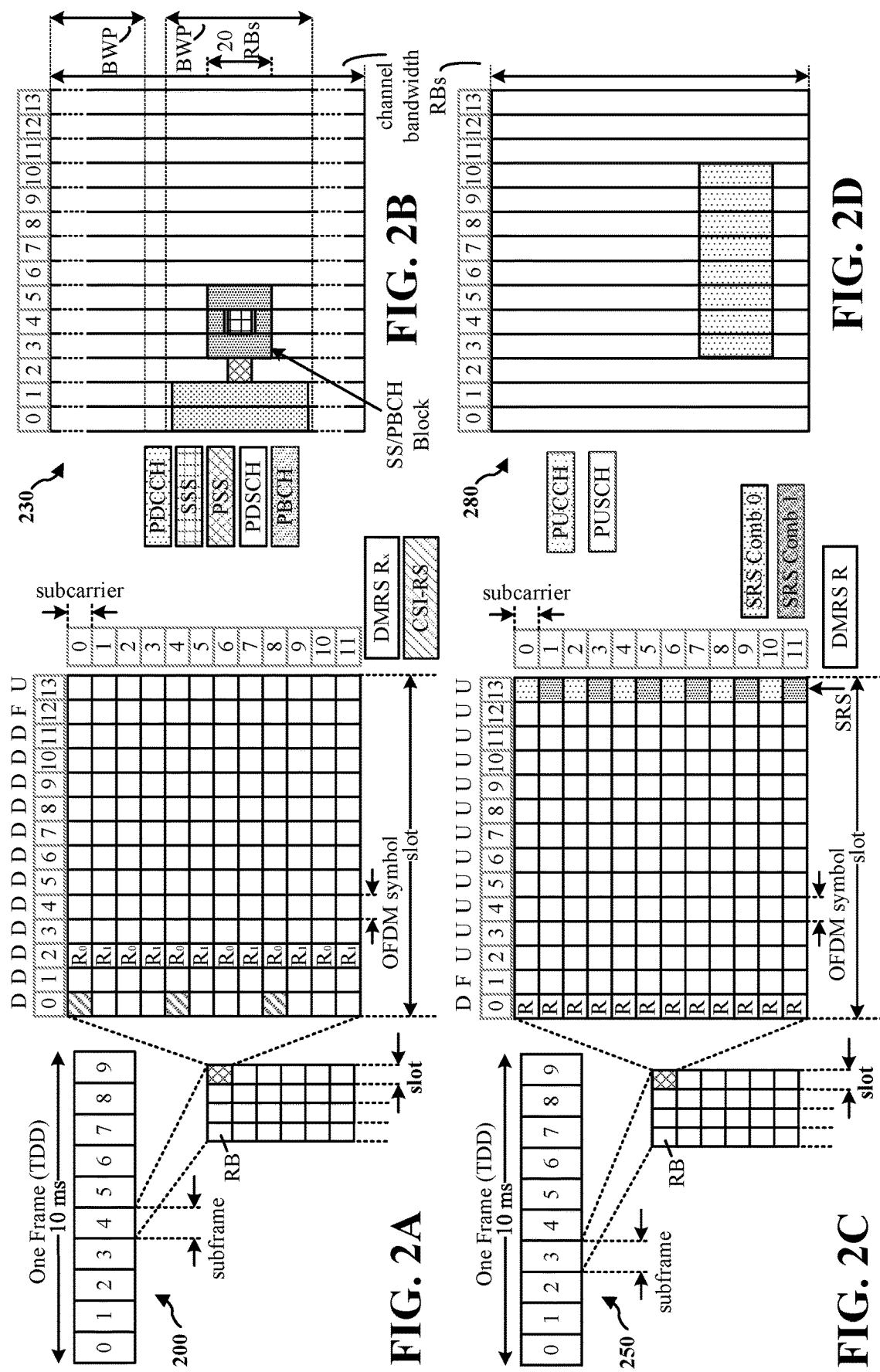
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
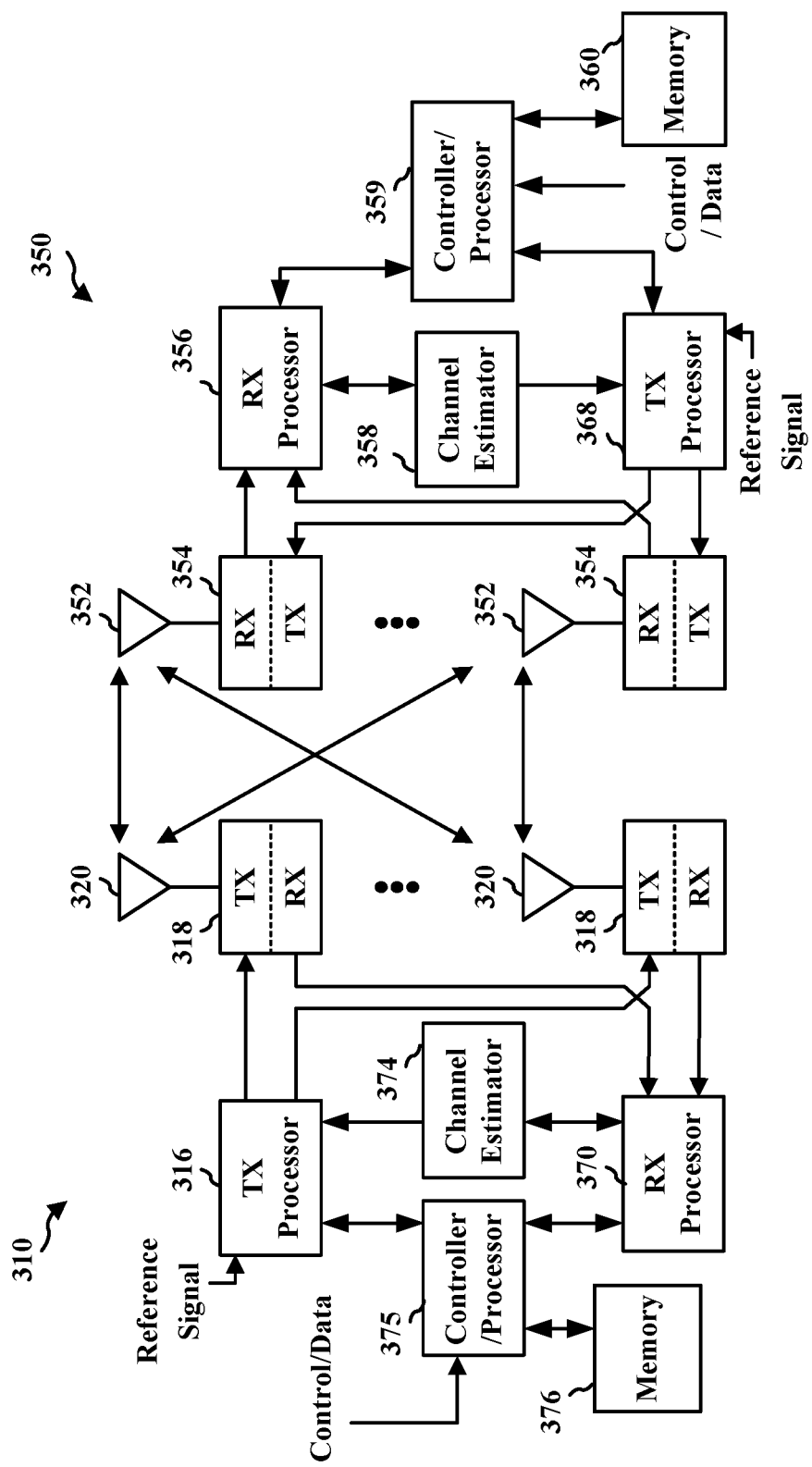
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with beam prioritization component 198 of FIG. 1.

At least one of the TX processor 316, the RX processor 370, and the controller/processor 375 may also be configured to perform aspects in connection with beam prioritization component 198 of FIG. 1.

Figure 4:
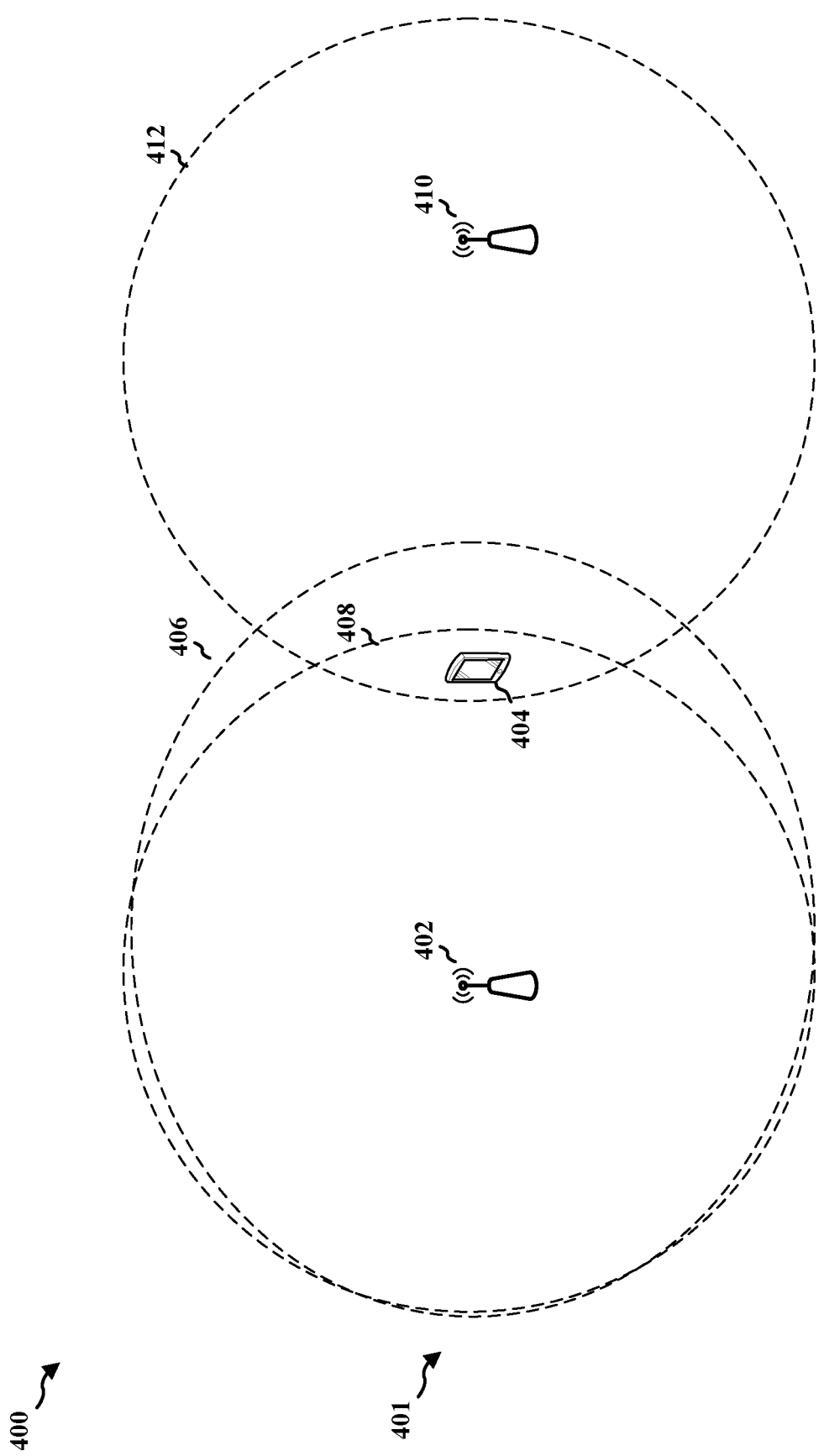
FIG. 4 is a diagram illustrating an example of a UE in communication with one or more base stations of different serving cells.

In carrier aggregation (CA), two or more component carriers can be aggregated in order to support wider transmission bandwidths. Each component carrier is associated with a serving cell, e.g., primary or secondary cells. FIG. 4 illustrates an example 400 of a serving cell 401 including coverage of a primary cell 406 and coverage of a secondary cell 408 in which one or more base stations 402 may communicate with a UE 404. The primary cell 406 is served by a primary component carrier (PCC) which the base station 402 may use for signaling control and user data to the UE 404. The secondary cell 408 is served by a secondary component carrier (SCC) which the base station 402 may use for signaling user data in additional radio resources to the UE 404. While FIG. 4 only illustrates a single secondary cell 408, multiple component carriers/secondary cells may be configured for communication between the base station 402 and the UE 404.

As the UE 404 moves relative to the base station 402, the UE may be better served by a different base station 410 in a different serving cell 412 (which may include its own primary and secondary cells). Thus, a handover may be performed from a source base station that currently serves the UE (e.g. base station 402) to the other base station, e.g., a target base station (for example, base station 410). In order to reduce handover interruption latency, a make-before-break (MBB) handover can be utilized. In case of MBB handover, when the source base station sends a handover command including a MBB handover indication (RRC Connection Reconfiguration Message with Mobility Control Info) to the UE, then the UE will continue to maintain an active connection with the source base station using a protocol stack associated with the source base station. The UE may configure another protocol stack with the target base station configuration and perform handover to the target base station. During handover execution period, the UE may use different RF chains for having simultaneous data downlink and uplink communication with both source and target base stations.

Figure 5:
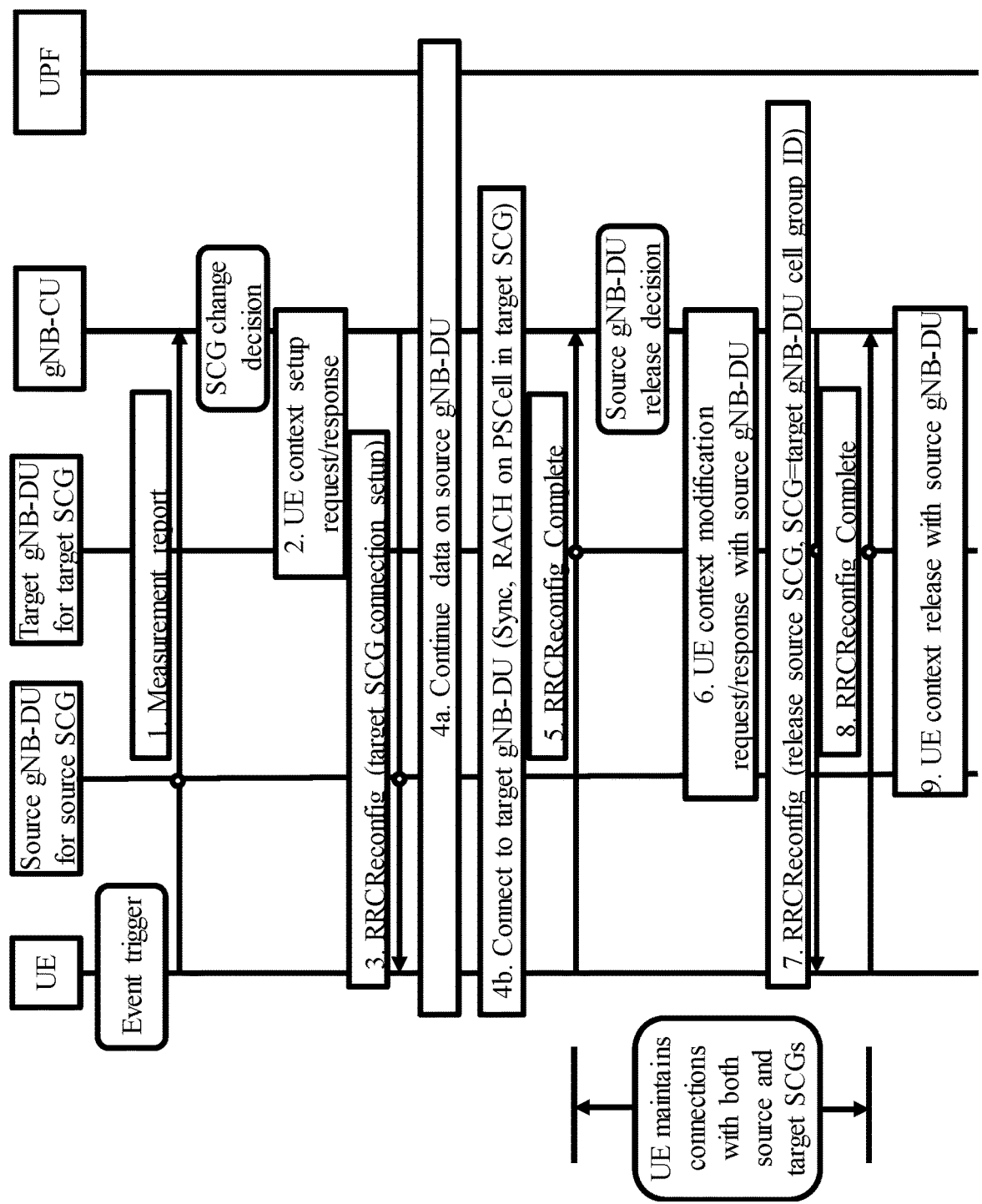
FIG. 5 is a diagram illustrating an example make-before-break (MBB) handover procedure for a UE from a source base station to a target base station.

FIG. 5 illustrates a MBB handover (MBB HO) procedure 500 for a UE from a source base station to a target base station. The communication flow may correspond to a dual active stack based intra-radio access technology (RAT) handover that enables the UE to have simultaneous active data transfer between the source base station and the target base station during the handover execution procedure. The RAT may comprise NR, for example. The source base station and the target base station may each comprise a gNB, for example. The distributed unit (DU) of the source and the DU of the target base station may be connected to a common central unit (CU). The base stations may be connected to a same core network, e.g., a 5G core network such as core network 190 described in connection with FIG. 1.

In one aspect, the MBB HO may occur between a source base station and a target base station in different secondary cell groups (SCGs), in which the source base station is in a source SCG, and the target base station is in a target SCG. Alternatively, the source base station and target base station may be in different master cell groups (MCGs). For example, a UE capable of dual connectivity (DC) may communicate with different base stations separately controlling a MCG and a SCG. In millimeter wave (mmW) frequencies (e.g. above 6 Hz or FR2) where limited coverage situations may arise, the UE may need to handover from a source SCG to a target SCG. The source and target SCGs may be managed by different gNB DUs, which are controlled under the same gNB CU. Each SCG may include a primary secondary cell group cell (PSCell) and optionally one or more secondary cells (SCells).

Accordingly, FIG. 5 illustrates a MBB HO between a source and target base station in different SCGs. The source base station may correspond to source base station 402 in a first cell 406 or 408, and the target base station may correspond to target base station 410 in a second cell 412, as illustrated for instance in FIG. 4. In some aspects, a handover event may be triggered while a UE is connected to the source base station, causing the UE to communicate a measurement report with the gNB-CU. For example, at step 1, the measurement report may indicate to the gNB-CU that the UE initiated a MBB HO. Accordingly, gNB-CU may make a SCG change decision in response to receiving the measurement report. The gNB-CU and the target base station may then implement handover signaling. For example, at step 2, the gNB-CU and target gNB-DU may generate a UE context setup request/response.

The gNB-CU may then transmit a reconfiguration message to the UE, e.g., a target SCG connection setup message. For example, at step 3, the gNB-CU may transmit an RRC Reconfiguration to the UE. For example, the RRC Reconfiguration message may include CellGroupConfig (Reconfigwithsync) information along with an indication for the UE to initiate an MBB HO procedure. Upon reception of the RRC Reconfiguration message, UE may maintain connections with both the source cell and target cell until the handover is complete. For example, at step 4a, the UE may continue data transmission and reception on the source gNB-DU. Packet data may be exchanged between the UE and the source base station, as well as between the source base station and a UPF.

The UE may connect to the target base station through a handover RACH procedure. For example, at step 4b, the UE may connect to target gNB-DU including synchronization and RACH on a PSCell in the target SCG. The UE can then transmit an RRC connection reconfiguration complete message to the target base station. For example, upon connection with the target gNB-DU, at step 5, the UE may transmit an RRC Connection Reconfiguration Complete message to the gNB-CU. Packet data can then be exchanged between the UE and the target base station. Upon reception of the RRC Connection Reconfiguration Complete message, the gNB-CU may determine a source gNB-DU release decision.

The UE can maintain connections to both the source and target base stations (in the source and target SCGs) and may receive from and transmit to both base stations over a period of time during the handover procedure. In MBB HO, the UE can maintain connections to the source and target base stations from the time the UE receives the RRC connection reconfiguration message until the UE releases the connection with the source base station. For example, at step 6, the source gNB-DU, the target gNB-DU, and the gNB-CU may determine a UE Context Modification Request/Response with the source gNB-DU, and at step 7, the gNB-CU may transmit a RRC Reconfiguration message that releases the source gNB-DU cell group. Upon reception of the RRC Reconfiguration message, the UE may release connection to the source gNB. For example, at step 8, the UE may transmit a RRC Reconfiguration Complete message to gNB-CU, and at step 9, the gNB-CU and the target gNB-DU determine a UE Context Release with the source gNB-DU. Once the UE releases the connection with the source base station, the UE may communicate only with the target base station.

When a UE is simultaneously connected to multiple cells (e.g. in carrier aggregation, or during a MBB SCG HO as described above), the UE may simultaneously receive downlink signals in separate beams from the base stations in the multiple cells, and the UE may simultaneously transmit uplink signals in separate beams to the base stations in the multiple cells. For example, physical downlink control channel (PDCCH) monitoring occasions may overlap in different cells, and therefore a UE may simultaneously receive control information from multiple cells in different beams (e.g. with different quasi-colocation (QCL) parameters). Similarly, the UE may receive data in different default physical downlink shared channel (PDSCH) beams from the multiple cells which overlap in time, receive information (e.g. reference signals (RS)) in different downlink beams in other downlink channels from the multiple cells which overlap in time, or transmit information (e.g. RS) in different uplink beams in uplink channels to the multiple cells which overlap in time.

In such cases, the UE and base station(s) may prioritize the beams of the multiple cells according to one or more beam prioritization rules (for example, a QCL prioritization rule) and may determine which beam corresponding to one of the cells to receive or transmit. In one example rule, if the UE simultaneously receives information carried in a first downlink channel from a first cell and in a second downlink channel from a second cell, the UE and base station(s) may determine that the information carried in the first downlink channel (or the first downlink channel itself) has higher priority than the information carried in the second downlink channel (or the second downlink channel itself). The UE and base station(s) may then select the beam(s) from the cell corresponding to the higher priority information/channel. Such downlink channels or information may include, e.g., PDCCH, PDSCH, CSI-RS with ON or OFF repetition, CSI-RS for CSI reporting, periodic/semi-persistent/aperiodic (P/SP/AP) CSI-RS, and synchronization signal blocks (SSB). In another example rule, the UE and base station(s) may determine that the first cell has higher priority than the second cell. For instance, the UE and base station(s) may determine the downlink channel/information from the target cell has higher priority than that of the source cell, and may thus select the beam(s) from the target cell. In a further example rule, the base station (e.g. a gNB-CU) may configure the different cells (for example, a source SCG PSCell and a target SCG PSCell) to transmit the information/downlink channels on the same beam (e.g. with the same QCL parameter). The UE and base station(s) may similarly prioritize beams for uplink channels or information carried by the uplink channels as described above. Such uplink channels or information may include physical uplink control channel (PUCCH), physical uplink shared channel (PUSCH), and sounding reference signal (SRS).

The aforementioned examples are not intended to be limiting. The UE and base station(s) may determine the beam(s) corresponding to one of the cells to receive or transmit information according to other beam prioritization rules. For example, the UE may monitor PDCCH candidates in CORESETs of different cells, and the UE and base station(s) may determine to receive/transmit the beam for a selected CORESET based on any combination of the following rules: the CORESET configured for a common search space (CSS) may be higher priority than for the user-specific search space (US S), or vice-versa; for the same synchronization signal block (SS) type, the CORESET configured for a cell with a lower cell ID may have a higher priority than the cell with the higher cell ID, or vice-versa; for the same SS type or cell ID, the CORESET configured for an SS with a lower SS ID may have a higher priority than an SS having a higher SS ID, or vice-versa; or the CORESET configured for the target cell may have higher priority than for the source cell, or vice-versa. In another example, the UE and base station (s) may determine to receive/transmit a default PDSCH beam to receive/transmit PDSCH when a scheduling offset is less than a beam switch latency threshold according to any of the following rules: a single default PDSCH beam corresponding to one cell (e.g. the source cell or the target cell), a single default PDSCH beam corresponding to each cell (e.g. the default beam switches between the two cells), two simultaneously received PDSCH beams corresponding to the two cells, or pre-configured default PDSCH beam patterns. The UE and base station(s) may similarly prioritize beams in other ways when the UE is simultaneously connected to cells of different SCGs.

The UE and base station(s) may prioritize/select each beam according to any beam prioritization rule as described above on a per symbol basis, i.e. as the device monitors each symbol for each cell. For example, the UE and base station(s) may prioritize simultaneously received or transmitted beams associated with multiple cells (e.g. in carrier aggregation or MBB SCG HO), and may accordingly select a different beam, at every symbol. However, the aforementioned examples assume that the different cells are synchronized and have identical numerologies (e.g. their symbols have the same duration and their symbol boundaries are aligned in time). When the different cells have different numerologies or are asynchronous in time, their symbol durations may be different or their symbol boundaries may not be aligned. As an example, when a UE is undergoing a MBB handover from a source SCG cell to a target SCG cell with different numerologies, the UE may simultaneously receive partially overlapped PDCCH monitoring occasions due to the different symbol durations of each downlink channel. Similarly, when a UE is simultaneously connected to asynchronous cells, the UE may receive or transmit information on channels from the different cells with misaligned symbol or slot boundary timings.

Figure 6:
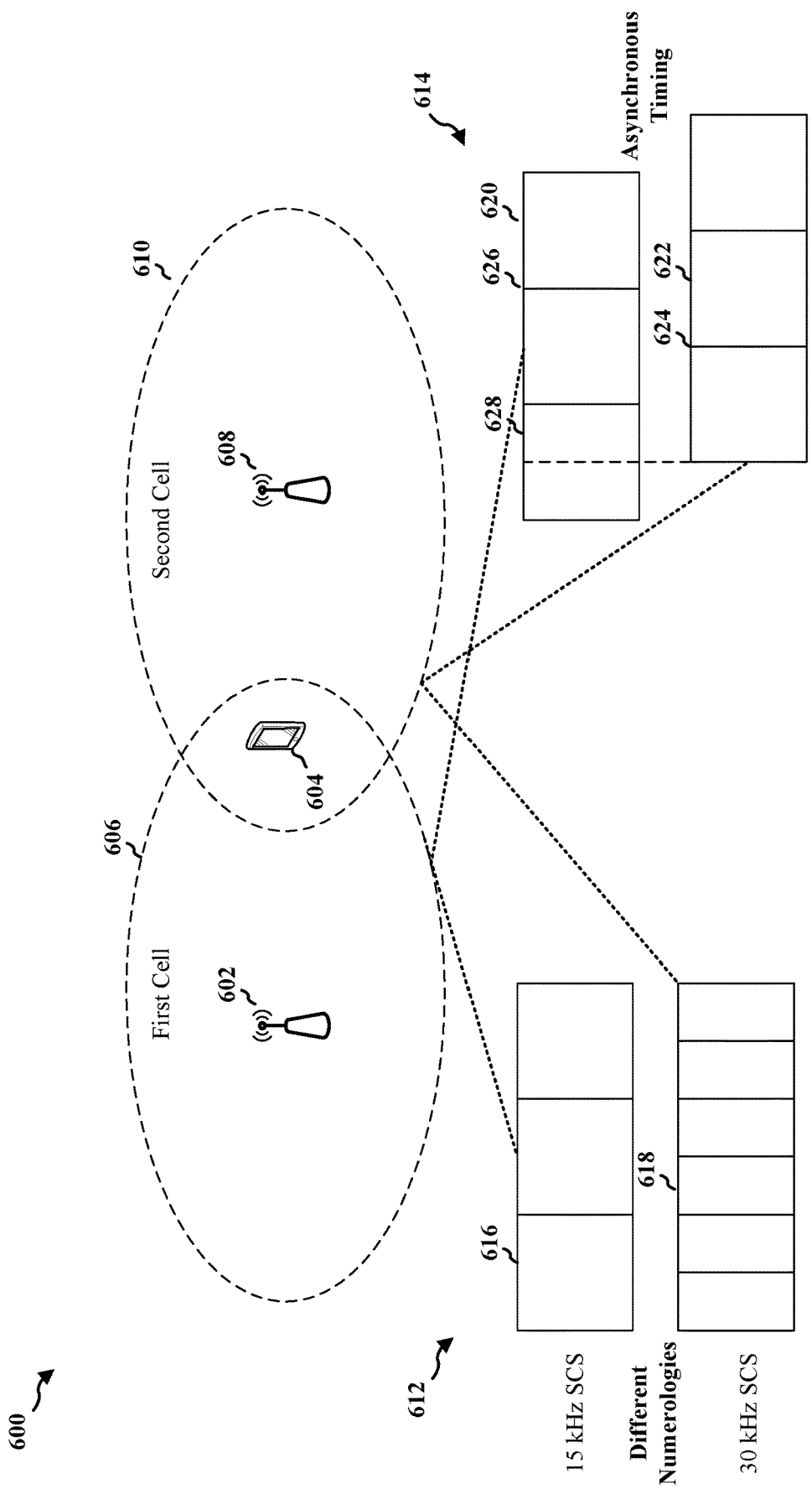
FIG. 6 is a diagram illustrating an example of a UE undergoing a MBB handover from a source base station in a first cell to a target base station in a second cell.

FIG. 6 illustrates an example diagram 600 in which a UE 604 is undergoing a MBB handover from a source base station 602 in a first cell 606 (e.g. in one SCG) to a target base station 608 in a second cell 610 (e.g. in another SCG). FIG. 6 depicts two example cell configurations for the first cell and the second cell. In the first cell configuration 612, the first cell 606 and the second cell 610 may include different numerologies. For instance, the base station 602 in the first cell 606 may configure a 15 kHz subcarrier spacing, while the base station 608 in the second cell 610 may configure a 30 KHz subcarrier spacing. Thus, the duration of each symbol 616 for the first cell may be longer than the duration of each symbol 618 for the second cell. In other examples, the duration of each symbol for the first cell may be shorter than the duration of each symbol for the second cell. In the second cell configuration 614, the first cell 606 and the second cell 610 may be asynchronous to each other. For instance, the timing of each symbol 620 for the first cell may be offset from the timing of each symbol 622 for the second cell. Thus, the symbol boundaries 624 of each symbol 620, 622 may be misaligned in time. While these examples are illustrated in reference to a MBB HO in which a UE is simultaneously connected to different base stations in the first cell 606 and the second cell 610, it shall be understood that these examples may also occur in reference to carrier aggregation in which a UE is simultaneously connected to different cells 606, 610 served by the same base station.

Aspects presented herein provide beam prioritization rules that address beam conflict resolution in such situations as illustrated in FIG. 6. For example, when the cells 606, 610 have different numerologies, it may be unclear whether the UE 604 and base station(s) 602 and/or 608 may determine a beam to have priority on a per symbol basis based on the cell having the shorter duration of symbols 618 or the longer duration of symbols 616. Similarly, when the cells 606, 610 are asynchronous to each other with misaligned symbol boundaries 624, it may be unclear which cell serves as the timing reference for the UE 604 and base station(s) to determine the prioritized beam on a per symbol basis. Therefore, the aspects presented herein enable a UE and base station(s) to determine the cell to be referenced when prioritizing beams received from or transmitted to cells which have different numerologies or are asynchronous to each other.

The present disclosure allows a UE and base station(s) to prioritize beams simultaneously received from or transmitted to cells of different numerologies or which are asynchronous to each other according to various aspects. In this way, simultaneous beam conflict resolution may be improved for cells having different numerologies or which are asynchronous to each other. In one aspect where the UE is simultaneously connected to multiple cells with different numerologies, the UE and base station(s) may apply a beam prioritization rule to determine a beam of one of the cells on a per symbol basis with respect to a preconfigured cell (e.g. the source cell, the target cell, the cell which has the longer symbol duration, or the cell which has the shorter symbol duration) or with respect to an indicated cell (e.g. the cell indicated in a radio resource control (RRC) message or a medium access control (MAC) control element (MAC-CE) from one of the cells, for example, the source cell). In one example, the UE and base station(s) may apply a beam prioritization rule to determine beams based on the cell having the shorter symbol duration. Thus, referring to FIG. 6, when the first cell 606 has a longer symbol duration than the second cell 610 (e.g. symbols 616 are twice the duration of symbols 618), the UE 604 and base station(s) 602, 608 may determine to receive/transmit beams from one of the first cell 606 or second cell 610 at every symbol of the second cell 610. As a result, the prioritized beam can change from one cell to another within each symbol of the first cell. In another example, the UE and base station(s) may apply a beam prioritization rule to determine beams based on the cell having the longer symbol duration. Thus, referring to FIG. 6, the UE 604 and base station(s) 602, 608 may determine to receive/transmit beams from one of the first cell 606 or second cell 610 at every symbol of the first cell 606. As a result, the UE and base station(s) cannot change or re-determine the prioritized beam within each symbol of the first cell. The cells 606, 610 may be on a higher frequency range (e.g., above 6 GHz), and may be a source cell and a target cell during a handover or a primary cell and secondary cell in carrier aggregation. In either example, the UE and base station(s) may apply the beam prioritization rules to simultaneously received/transmitted PDCCH beams, default PDSCH beams, other downlink channel beams containing RSs (e.g. a first RS such as CSI-RS), and/or uplink channel beams containing RSs (e.g. a second RS such as SRS) to determine which beam to receive from, or transmit to, for one of the cells 606, 610.

In another aspect where the UE is simultaneously connected to multiple cells which are asynchronous to each other, the UE and base station(s) may apply a beam prioritization rule to determine a beam of one of the cells on a per symbol boundary basis with respect to a fixed, preconfigured cell (e.g. the source cell, the target cell, the cell which has the longer symbol duration, or the cell which has the shorter symbol duration), or a fixed, indicated cell (e.g. the cell indicated in a RRC message or MAC-CE from one of the cells, for example, the source cell). For example, referring to FIG. 6, when the symbols 620 of the first cell 606 are offset from the symbols 622 of the second cell 610 and the fixed cell is preconfigured or indicated to be the second cell 610, the UE 604 and base station(s) 602, 608 may determine to receive/transmit beams from one of the first cell 606 or second cell 610 at every symbol boundary 624 of the second cell 610. Similarly, if the fixed cell is preconfigured or indicated to be the first cell 606, the UE 604 and base station(s) 602, 608 may determine to receive/transmit beams from one of the first cell 606 or second cell 610 at every symbol boundary 626 of the first cell 606. In another aspect, the UE and base station(s) may apply a beam prioritization rule to determine beams on a per symbol boundary basis with respect to a cell from which the latest downlink communication was received or the latest uplink communication was transmitted. For instance, if the UE and base station(s) originally determine to receive or transmit beams at every symbol boundary 624 of the second cell 610, but then receives or transmits in the first cell 606 based on the aforementioned beam priority rules (for example, a downlink channel of the first cell is determined to have higher priority than that of the second cell), the UE and base station(s) subsequently determine to receive/transmit beams at every symbol boundary 626 of the first cell 606. In a further aspect, the UE and base station(s) may refrain from applying a beam prioritization rule to determine beams during partial symbols resulting from the misaligned symbol boundaries. For example, if the UE and base station(s) switch from determining beams at every symbol boundary 624 to determining beams at every symbol boundary 626 as described above, the UE and base station(s) may refrain from determining a new beam during the partial symbol 628 which may result due to the switching from misaligned symbol boundaries.

In an additional aspect, although the UE may simultaneously receive beams from or transmit beams to the first cell and the second cell from the UE's perspective, and therefore apply the beam prioritization rules to determine which beam to select at every symbol or symbol boundary as described above, the timing from the base station's perspective may be different due to propagation delays. For example, referring to FIG. 6, although UE 604 may simultaneously receive downlink information from the base station 602 in the first cell 606 and the base station 608 in the second cell 610, the base stations 602, 608 may not have transmitted the downlink information at the same time (e.g. base station 608 may be farther away from UE 604 than base station 602, resulting in a greater propagation delay for transmission). Thus, the base stations may not be aware of the simultaneous reception beam conflict at the UE. Similarly, the base stations may not be aware of simultaneous transmission beam conflicts uplink from the UE due to the propagation delays. Accordingly, when the UE determines to receive a beam from (or transmit a beam to) one of the first cell or the second cell as described above, the UE may further transmit to the base station 602 and/or 608 a timing difference between when the beam is received from or transmitted to the first and second cells. The base station(s) may subsequently determine the successfully (or unsuccessfully) transmitted/received beam based on the timing difference. For instance, if the base stations 602, 608 respectively transmit their beams at symbols 0 and 1 and the UE receives both beams at symbol 5 (due to a 1 symbol propagation delay difference between the base stations), the UE may apply a beam prioritization rule to determine to receive only the beam from one of the two base stations. If the UE determines to receive from base station 608, for example, the UE may transmit the aforementioned timing difference (e.g. the propagation delay difference of 1 symbol) to base station 602, thereby indicating to base station 602 that a beam conflict exists within 1 symbol of base station 608's transmission. Base station 602 may then determine that its beam was unsuccessfully transmitted (e.g. that an overlap in time has occurred) and retransmit accordingly, for example, additional symbols later than base station 608 in attempt to minimize beam conflict. For instance, when the base station determines an overlap in time has occurred (e.g. based on the received timing difference), base station 602 may apply a beam prioritization rule to select a beam (e.g. the unsuccessfully transmitted beam), and re-transmit the selected beam accordingly.

When the UE is simultaneously connected to two cells and the UE and base station(s) determine a beam based on the aforementioned beam prioritization rules of one of the cells on a per symbol or per symbol boundary basis as described above, the UE may switch from one cell to another mid-transmission. For example, a continuous transmission from the first cell 606 spanning a certain number of symbols of a determined cell (e.g. the cell with shorter symbol duration, etc.) may be interrupted if the second cell 610 is determined to have a higher priority beam during one of those symbols or symbol boundaries. Therefore, in an alternative aspect, the UE and base station(s) may only apply a beam prioritization rule to determine beams after completing reception or transmission of a continuous transmission having a same known beam indication. For example, when the UE 604 and base station 602 receives/transmits a beam including a first transmission spanning multiple symbols from the first cell 606, the UE 604 and base station 602 will determine to continue receiving/transmitting the same beam from the first cell 606 until the first transmission completes, even if during one of the symbols of the first transmission the UE 604 receives a second transmission from the second cell 610 which may be higher priority than the first cell. In other words, after the UE and base station(s) determine a beam based on the aforementioned beam prioritization rules as described above, the UE and base station(s) will refrain from applying these rules (e.g. determining a new beam or changing the beam) during the continuous transmission until that transmission has completed. Such continuous transmissions with the same known beam indication may include, for example, a control resource set (CORESET) or synchronization signal block (SSB) associated with a potential PDCCH transmission, a downlink signal associated with a TCI state previously decoded by the UE, or an uplink signal associated with a spatial relation previously decoded by the UE.

While the above examples refer to the situation where the UE is simultaneously connected to multiple cells, in an alternative aspect of the present disclosure, the UE may be restricted from simultaneously connecting to cells which have different symbol durations or misaligned symbol boundaries, as well as beam based transmissions. The base station may indicate that beam based transmissions are present for downlink communications based on a transmission configuration indication (TCI) state indicating a QCL-Type D property (e.g. indicating that multiple cells' RS transmissions have similar spatial reception (Rx) parameters), or for uplink communications based on spatial relations (e.g. indicating that multiple cells' RS transmissions have a spatial relationship to PUCCH). The cells may be on a higher frequency range (e.g., above 6 GHz), and may be a source cell and a target cell during a handover.

For instance, during a handover, a beam prioritization rule may cause the UE to refrain from (or the base station may prevent the UE from) simultaneously connecting to multiple cells which are associated with beam based transmissions and which have either different numerologies or which are asynchronous to each other. In other words, the UE may be restricted from MBB handovers and only be allowed break-before-make (BBM) handovers in which connection with the source cell is released before connection to the target cell. As one example, referring to FIG. 6, when UE 604 is connected to a source base station 602 and is requesting a handover to target base station 608, the UE may apply a beam prioritization rule to determine whether the two cells 606, 610 include beam based transmissions (for example, based on a TCI state) and have different numerologies or are asynchronous in time. In such case, when sending the measurement report at step 1 of FIG. 5, the UE may only request a BBM handover. Alternatively, the base station (602, 608) may determine whether the two cells 606, 610 include beam based transmissions and have different numerologies or are asynchronous in time, rather than the UE. In such case, even if the UE requests a MBB handover, the base station may only allow a BBM handover based on the determination.

Figure 7:
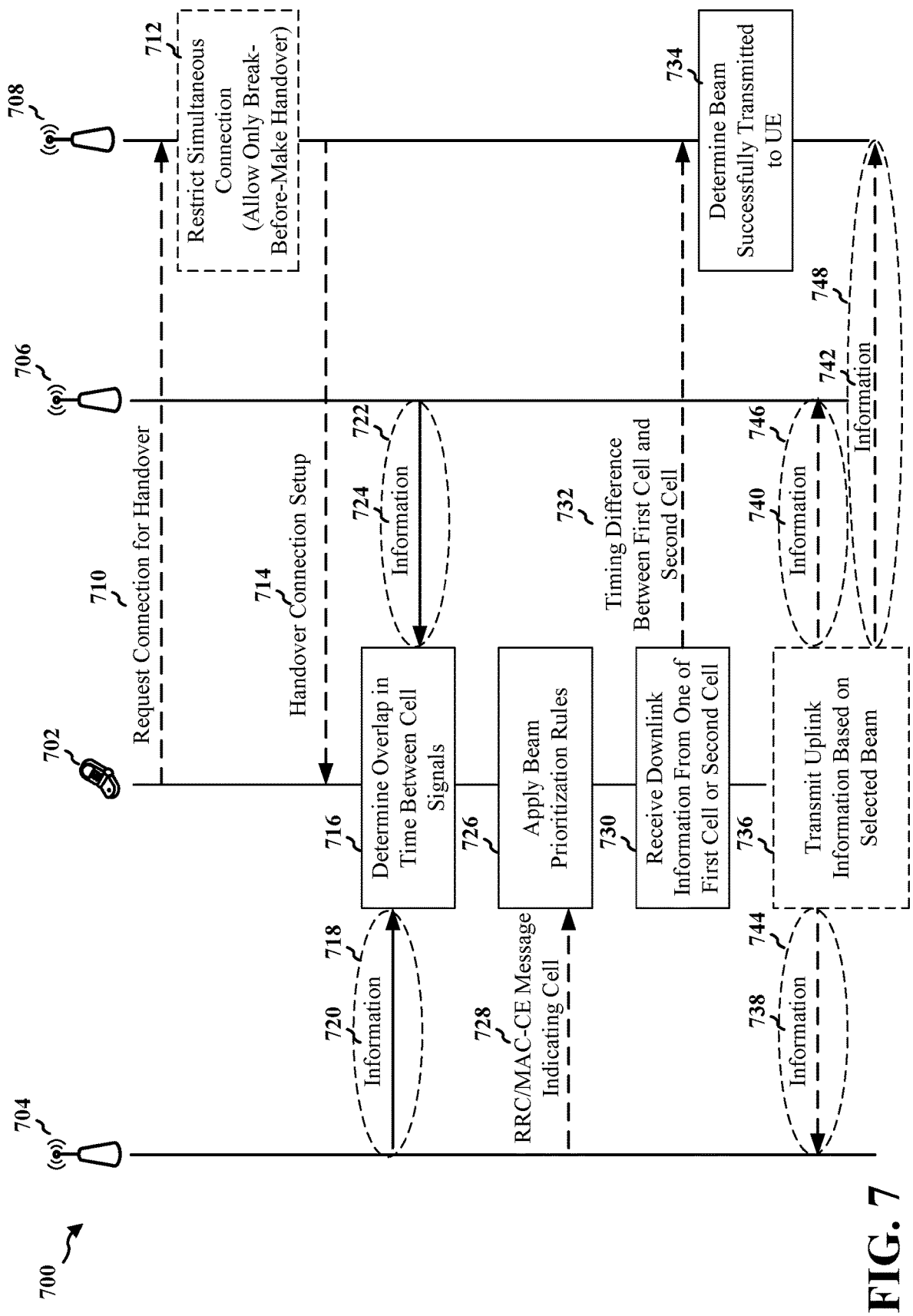
FIG. 7 is a diagram illustrating an example call flow between a UE and one or more base stations in one or more serving cells.

FIG. 7 illustrates an example call flow diagram 700 between a UE 702 and one or more base stations 704, 706, 708 in one or more serving cells. In the example of FIG. 7, the UE 702 is requesting to undergo a MBB handover (as described above in FIG. 5) from a source base station 704 to a target base station 706 in different SCGs, which are distributed units (DUs) of a common central unit (CU) base station 708. Thus, referring to FIGS. 5 and 6, the UE 702 may correspond to UE 604, the source base station 704 may correspond to base station 602 in first cell 606 or source gNB-DU, the target base station 706 may correspond to base station 608 in second cell 610 or target gNB-DU, and the CU base station 708 may correspond to gNB-CU. In other examples, the UE 702 is simultaneously connected to different cells of one of more base stations 704, 706 in carrier aggregation (e.g. as illustrated in FIG. 4). Thus, referring to FIG. 4, the UE 702 may correspond to UE 404, the base station 704 may correspond to base station 402 in primary cell 406, and the base station 706 may correspond to base station 402 in secondary cell 408. Alternatively, the base station 704 may correspond to base station 402 in serving cell 401, and the base station 706 may correspond to base station 410 in cell 412. In the aforementioned examples, the first and second cells have different numerologies or are asynchronous to each other.

In one example where the UE is undergoing a MBB SCG handover, the UE 702 may first transmit a request 710 to the CU base station 708 for a handover from the source base station 704 to the target base station 706, as described above with respect to FIG. 5. In one aspect, the CU base station 708 may determine that the first and second cells have beam based transmissions and have different numerologies or are asynchronous to each other, and based on the determination, may restrict 712 the UE from simultaneously connecting to both the source base station 704 and the target base station 706. For instance, during the handover, the base station 708 may prevent the UE 702 from simultaneously connecting to multiple cells which are associated with beam based transmissions and which have either different numerologies or which are asynchronous to each other. In other words, the UE may be restricted from MBB handovers and only be allowed break-before-make (BBM) handovers in which connection with the source base station 704 is released before connection to the target base station 706. The CU base station 708 may send a BBM handover connection setup message to the UE 702 accordingly. Otherwise, if the CU base station 708 allows the UE to simultaneously connect to both the source base station 704 and the target base station 706, the CU base station 708 may send a MBB handover connection setup message to the UE 702, as described above in FIG. 5. For example, the handover connection setup message 714 may be the RRC reconfiguration message described at step 3 of FIG. 5.

When the UE 702 is simultaneously connected to both the source base station 704 and target base station 706 during a MBB handover, or when the UE is simultaneously connected to multiple cells of base stations 704 and/or 706 in carrier aggregation, the UE may determine an overlap 716 in time between signals received from the base stations 704, 706 in separate beams from the first and second cells. For example, the UE 702 may receive information 720 (e.g. SSB, CORESET, PDCCH, PDSCH, RS's, etc.) on a first beam 718 from the first cell of base station 704, and the UE 702 may simultaneously receive information 724 (e.g. SSB, CORESET, PDCCH, PDSCH, RS's, etc.) on a second beam 722 from the second cell of base station 706.

As a result of the conflict from simultaneous beam reception, the UE 702 applies a beam prioritization rule 726 to identify or select a beam from the beams 718, 722 associated with the downlink channels carrying the information 720, 724 from one of the first or second cells. In one example, the UE may select the beam 726 based on the aforementioned beam prioritization rules on a per symbol basis with respect to a preconfigured cell or with respect to an indicated cell, as described above with respect to FIG. 6. For instance, the source base station 704 may transmit a message 728 (e.g. RRC or MAC-CE) to the UE 702 indicating that the aforementioned beam prioritization rules should be applied to every symbol associated with the first cell (source cell). Thus, the UE may determine to select a beam 726 from either the source cell (e.g. beam 718) or the target cell (e.g. beam 722) during each symbol of the source cell. For example, the UE may determine whether beam 718, 722 is the higher priority beam (based on the beam prioritization rule) at the start of each symbol of the source cell, and accordingly select the higher priority beam during that symbol.

In another example, the UE may identify or select the beam 726 based on the aforementioned beam prioritization rules on a per symbol boundary basis with respect to a fixed, preconfigured or indicated cell, or with respect to a cell from which the latest downlink communication was received or the latest uplink communication was transmitted. For example, as shown in FIG. 7, information 724 may be received at least one symbol after information 720, but while information 720 is still being transmitted. Therefore, the UE may determine to select a beam 726 from either the source cell (e.g. beam 718) or the target cell (e.g. beam 722) during each symbol boundary of the target cell, since the latest/current communication (e.g. information 724) originated from that cell. For example, the UE may determine whether beam 718, 722 is the higher priority beam (based on the beam prioritization rule) at the start of each symbol boundary of the target cell, and accordingly select the higher priority beam during that symbol until the next symbol boundary. Moreover, if the higher priority beam is associated with the cell having a longer symbol duration (e.g. due to different numerologies), that beam may also have higher priority at each symbol boundary of the cell with the shorter symbol duration (within each longer symbol).

In a further example, the UE may select the beam 726 based on the aforementioned beam prioritization rules after completing a continuous transmission having a same known beam indication. For example, as shown in FIG. 7, information 724 may be received at least one symbol after information 720, but while information 720 is being continuously transmitted. Thus, the UE may determine to select a beam 726 from either the source cell (e.g. beam 718) or the target cell (e.g. beam 722) only after completing reception of information 720, and may similarly refrain from making beam selections in the interim.

Once the UE 702 applies a beam prioritization rule to make the beam selection, the UE receives the downlink information 730 (e.g. information 720 or 724) from either the first cell or the second cell associated with the selected beam. For example, after the UE simultaneously receives information on beams 718 and 722, the UE may determine based on message 728, based on symbol duration, etc. that beam selection should occur at every symbol of the source cell. After the UE determines when to make the beam selection, the UE selects one of the beams 718, 722 based on the aforementioned beam prioritization rules. For example, at the next symbol of the source cell, the UE 702 may determine that the target cell has higher priority than the source cell, and therefore determines to select the beam 722 carrying information 724, while dropping the beam 718 carrying information 720. However, since the base stations 704, 706, 708 may not be aware of the simultaneous beam reception conflict (e.g. due to different propagation delays for beams 718 and 722), the UE 702 may optionally transmit to one of the base stations (for example, CU base station 708) a timing difference 732 between receiving the information on beam 718 from the first cell and receiving the information on beam 722 from the second cell. Based on the timing difference, at 734, the base station 708 may determine which beam 718, 722 was successfully transmitted to the UE 702. For example, the base station 708 may determine from the timing difference 732 that although the source base station 704 transmitted one symbol before the target base station 706, the source base station's transmission of information 720 was dropped, and therefore the base station 708 may inform the source base station 704 to perform a retransmission of information 720.

The UE 702 may also transmit uplink communications based on the selected beam, at 736. For example, when the UE selects the beam 726 associated with one of the downlink information 720 or 724 as described above, the UE may transmit uplink information 738, 740, 742 (e.g. PUCCH, PUSCH, SRS, etc.) to any of base stations 704, 706, 708 using a corresponding beam 744, 746, 748 in spatial relation to the selected beam 726. The UE 702 may thus select beams for uplink channels when it selects beams for downlink channels. The UE may apply the aforementioned beam prioritization rules to select the uplink beams on a per symbol, per symbol boundary, or continuous transmission basis as described above. The UE may also feedback a timing difference to one of the base stations (for example, CU base station 708) between transmitting the information on beam 744 corresponding to the first cell and transmitting the information on beam 746 corresponding to the second cell so that the base station may similarly determine which beam 718, 722 was successfully transmitted to the UE 702.

Figure 8:
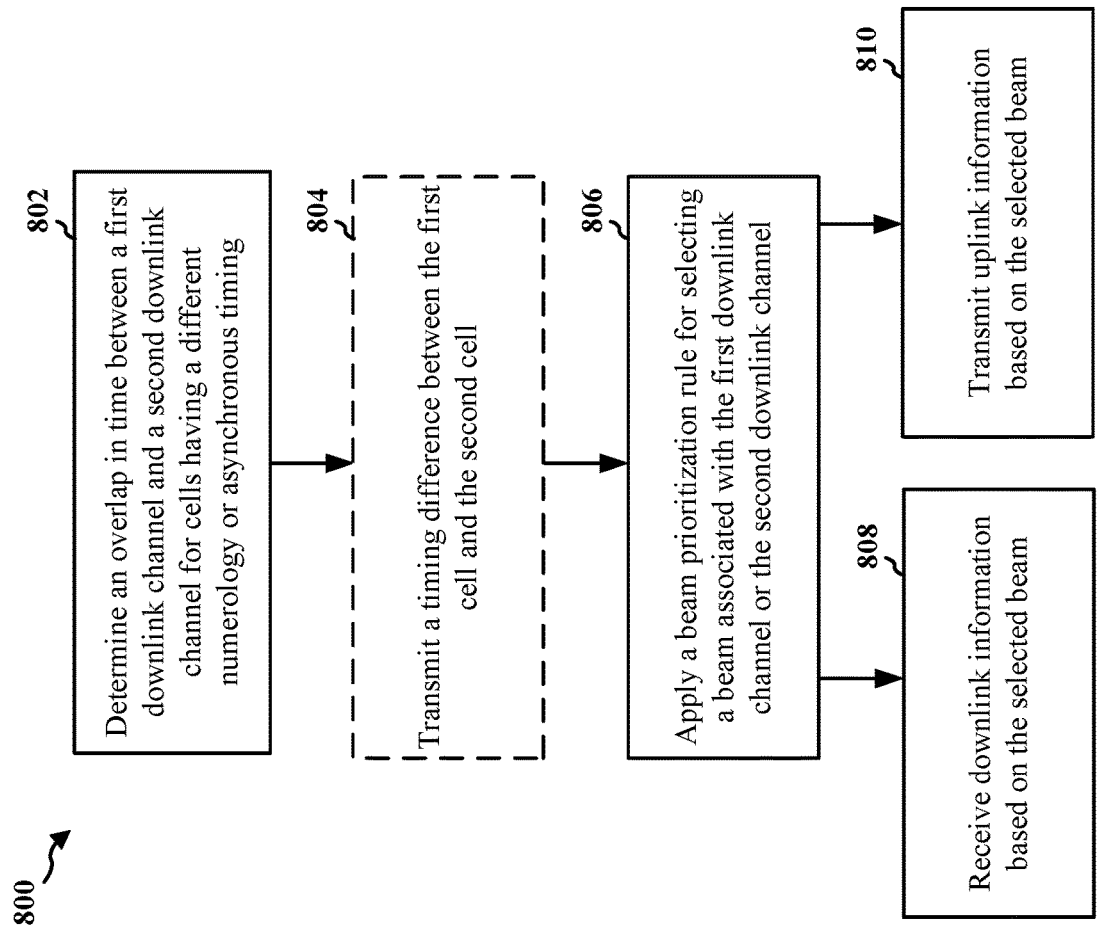
FIG. 8 is a flowchart of a method of wireless communication.

FIG. 8 is a flowchart 800 of a method of wireless communication. The method may be performed by a first wireless device, such as a UE or a component of a UE (e.g., the UE 104, 404, 604, 702; the apparatus 902/902'; the processing system 1014, which may include the memory 360 and which may be the entire UE 350 or a component of the UE 350, such as the TX processor 368, the RX processor 356, and/or the controller/processor 359). Optional aspects are illustrated with a dashed line. The method may enable a first wireless device such as a UE to determine a beam prioritization for receiving or transmitting communication with a first cell and/or a second cell having different numerologies or asynchronous timing.

At 802, the first wireless device determines an overlap in time between a first signal for a first cell and a second signal for a second cell, wherein the second cell includes at least one of a different numerology than the first cell or an asynchronous timing relative to the first cell. The overlap may be determined, e.g. by the overlap component 908 of the apparatus 902 in FIG. 9. The first signal and the second signal may each include a channel and a reference signal. The first signal and the second signal may both include downlink signals or may both include uplink signals. The first cell and the second cell may be in different SCG. The first cell and the second cell may be in different MCG. The first cell and the second cell may be in a frequency range of at least 6 GHz, and the first wireless device may be simultaneously connected to the first cell and the second cell during a make-before-break handover. For example, referring to FIG. 7, the UE 702 may determine an overlap 716 in time between downlink signals containing information 720, 724. The information 720, 724 may include PDCCH, PSDCH, CSI-RS, etc. The UE may also determine an overlap in time between uplink signals (e.g. containing information 738, 740). The information 738, 740 may include PUCCH, PUSCH, SRS, etc. Referring to FIG. 6, the first cell may be the first cell 606 and the second cell may be the second cell 610 as part of a MBB handover of UE 604 from a source base station 602 to a target base station 608. The first and second cells 606, 610 may be in different SCGs or MCGs (as described above with respect to FIG. 5).

At 806, the first wireless device applies a beam prioritization rule for selecting a beam associated with the first signal of the first cell or the second signal of the second cell carrying information in separate beams. The beam prioritization rule may be applied, e.g., by the beam prioritization component 910 of the apparatus 902 in FIG. 9. In some aspects, the second cell may include a different numerology than the first cell, and the beam prioritization rule applied at 806 may restrict the first wireless device from being simultaneously connected to the first cell and the second cell that have different numerology. In other aspects, the first wireless device may be connected to the first cell and the second cell, wherein the second cell includes the different numerology than the first cell, and the beam prioritization rule may be applied during a symbol of one of the first cell or the second cell. In some aspects, the second cell may be asynchronous to the first cell, and the beam prioritization rule may restrict the first wireless device from being simultaneously connected to the first cell and the second cell if the second cell is asynchronous to the first cell. In other aspects, the first wireless device may be connected to the first cell and the second cell, the second cell being asynchronous to the first cell. The beam prioritization rule may be applied at a symbol boundary of one of the first cell or the second cell. The one of the first cell or the second cell (whose symbol duration or boundary is used for the application of the beam prioritization rule) may include a source cell, a target cell, the cell having a longer symbol duration, the cell having a shorter symbol duration, or a cell identified from one of an RRC message or a MAC-CE. If the beam prioritization rule is applied per a symbol of one of the first cell or the second cell, the beam with a determined higher priority at a start of each symbol may be used by the first wireless device during each symbol for transmitting or receiving. If the beam prioritization rule is applied per symbol boundary of one of the first cell or the second cell having a longer symbol duration, and if the beam for the other cell has higher priority at each shorter symbol boundary within the longer symbol duration, the beam for the other cell may also be used for transmitting or receiving at each shorter symbol boundary within the longer symbol duration. The beam prioritization rule may be applied for at least one of simultaneous PDCCH beams, default PDSCH beams, downlink channel beams including reference signals, uplink channel beams including reference signals, beams from the first cell and the second cell, or beams to the first cell and the second cell. For example, referring to FIG. 7, the UE 702 may apply beam prioritization rules 726 to determine which beam 718, 722 to receive from one of the cells served by base station 704 or 706 when the cells have different numerology or are asynchronous to each other (as illustrated in FIG. 6). The beam prioritization rules may be applied with respect to each symbol or symbol boundary of one of the first or second cells, for example, the cell which is preconfigured, indicated (e.g. by message 728), or associated with a current downlink or uplink communication as described above. The UE may alternatively be restricted (e.g. at 712), from simultaneously connecting to both the source base station 704 and target base station 706 when their cells have different numerology or are asynchronous to each other.

The first wireless device may be involved in communication with the first cell or the second cell, e.g., a current downlink or uplink communication. In some aspects, the first wireless device may refrain from applying the beam prioritization rule for partially aligned symbols of the first cell and the second cell. The first wireless device may be connected to the first cell and the second cell, and the beam prioritization rule may be applied after receiving a continuous transmission having a same beam indication for the one of the first cell or the second cell. The first wireless device may refrain from applying the beam prioritization rule during the continuous transmission. For example, the first wireless device may determine not to change a selected beam during an ongoing continuous transmission having a same beam indication. The continuous transmission may include at least one of a CORESET or SSB with a potential PDCCH transmission, a downlink signal associated with a decoded TCI state, or an uplink signal associated with a decoded spatial relation for the uplink signal. For example, referring to FIG. 7, when applying the beam prioritization rules 726, if beam 718 is carrying information 720 in a continuous transmission, the UE 702 may determine to receive information 724 on beam 722 only after beam 718 has completed transmission. In other words, the UE 702 may refrain from applying the beam prioritization rules while the continuous transmission is being received.

The first wireless device may receive downlink information from a second wireless device (e.g. a base station) based on the selected beam, at 808. The selected beam may be determined, e.g., at 806. The downlink information may be received, e.g., by the reception component 904 of the apparatus 902 in FIG. 9. For example, referring to FIG. 7, the UE 702 may receive downlink information 730 from one of the first cell or the second cell based on the beam (e.g. beam 718, 722) determined at 726.

The first wireless device may transmit uplink information to a second wireless device (e.g. a base station), at 810, based on the selected beam, e.g., as determined at 806 using the beam prioritization rule. The uplink information may be transmitted, e.g., by the transmission component 906 of the apparatus 902 in FIG. 9. For example, referring to FIG. 7, the UE 702 may transmit uplink information 736 to one of the first cell or the second cell based on a spatial relation to the beam determined at 726. For example, the UE 702 may transmit information 738 or 740 in beams 744 or 746, respectively.

As illustrated at 804, the first wireless device may transmit, to a second wireless device (e.g. a base station), a timing difference between the first cell and the second cell, wherein the timing difference is for downlink communication or uplink communication. The timing difference may be transmitted, e.g., by the timing difference component 912 and/or the transmission component 906 of the apparatus 902. For example, the first wireless device may feedback a downlink and/or uplink timing difference between the two cells. The feedback of the timing difference may enable the second wireless device to determine a signal from one of the two cells that is dropped for the first wireless device. For example, referring to FIG. 7, the UE 702 may transmit a timing difference 732 to the base station 708 (and/or base station 704 and/or 706) for the base station(s) to determine which beam 734 (e.g. beam 718, 722) was successfully transmitted to the UE. The timing difference may be, for example, the difference in propagation delay between when information 720 was transmitted by base station 704 and received by UE 702 and when information 724 was transmitted by base station 706 and received by UE 702. For instance, if information 720 was transmitted by the base station 704 at symbol 0 and received by the UE at symbol 5, and if information 724 was transmitted by the base station 706 at symbol 1 and received by the UE at symbol 5, the propagation delay difference or timing difference between the two cells will be 1 symbol. Similarly on the uplink, the UE may transmit to the base station 708 (and/or base station 704 and/or 706) the timing difference between when information 738 was transmitted by the UE and received by base station 704 and when information 740 was transmitted by the UE and received by the base station 706.

Figure 9:
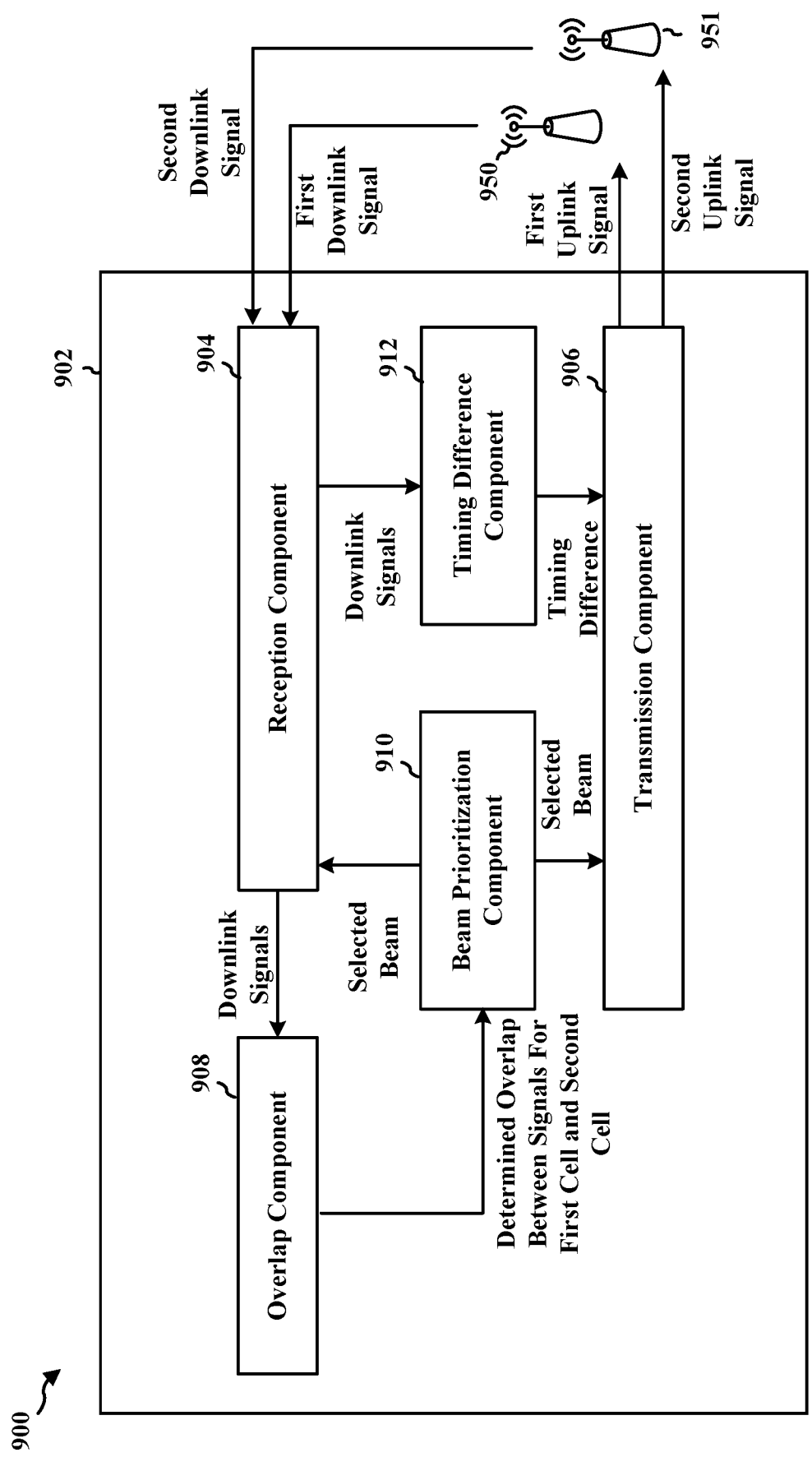
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a first wireless device, such as a UE or a component of a UE. The apparatus includes a reception component 904 that receives downlink communication, e.g., from a second wireless device, such as a base station 950 for a first cell and/or a base station 951 for a second cell. The apparatus includes a transmission component 906 that transmits uplink communication to the second wireless device (e.g. base station 950 and/or 951). The apparatus includes an overlap component 908 configured to determine an overlap in time between a first signal for a first cell and a second signal for a second cell, where the second cell includes at least one of a different numerology than the first cell or an asynchronous timing relative to the first cell, e.g., as described in connection with 802 in FIG. 8. The apparatus includes a beam prioritization component 910 configured to apply a beam prioritization rule for selecting a beam associated with the first signal of the first cell or the second signal of the second cell carrying information in separate beams, e.g., as described in connection with 806 in FIG. 8. The reception component 904 may be configured to receive information from the second wireless device based on the selected beam, e.g., as described in connection with 808 in FIG. 8. The transmission component 906 may be configured to transmit information to the second wireless device based on the selected beam, e.g., as described in connection with 810 in FIG. 8. The apparatus includes a timing difference component configured to transmit, to the second wireless device (e.g., base station 950 or 951), a timing difference between the first cell and the second cell, e.g., as described in connection with 804 in FIG. 8.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
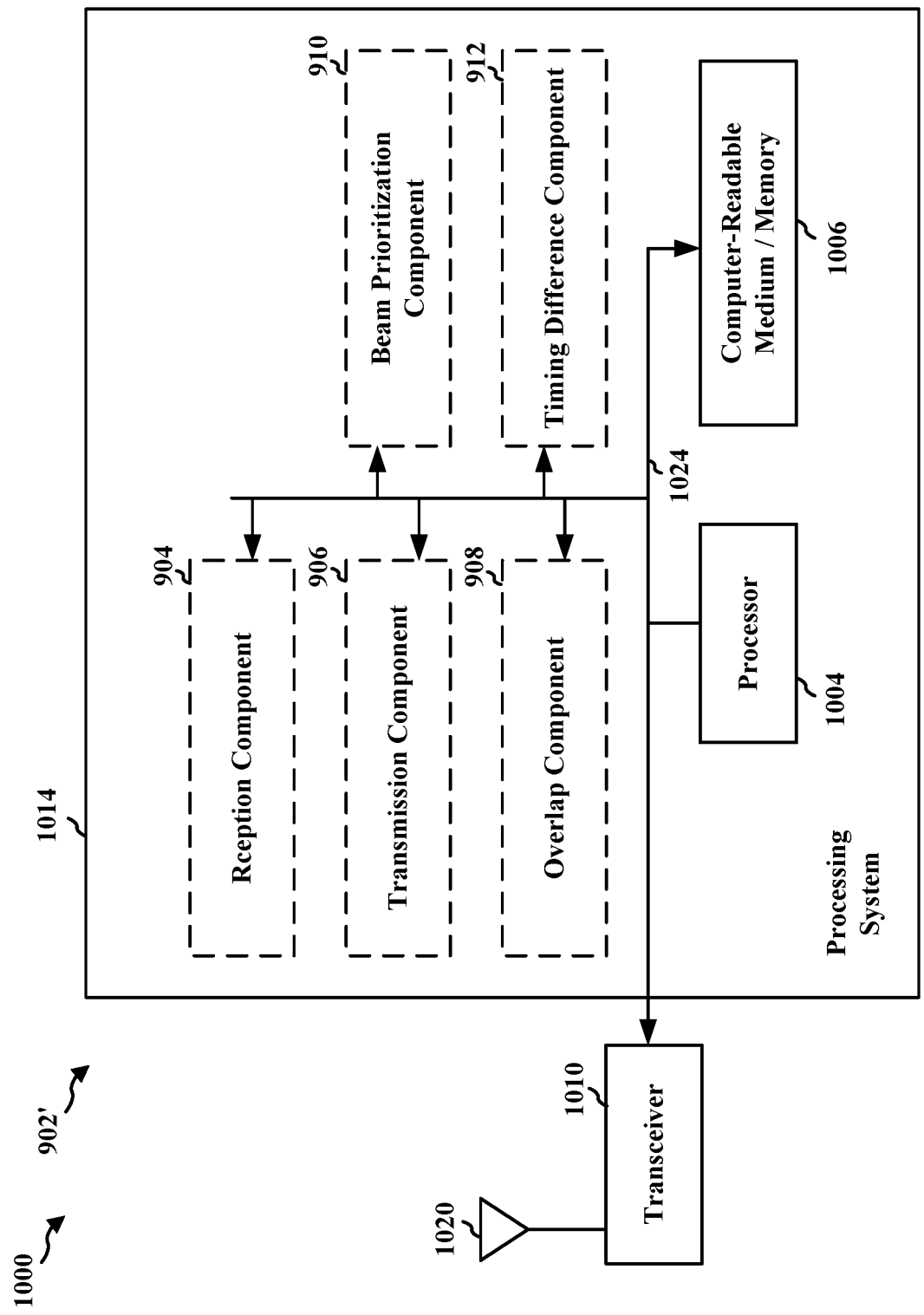
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359. Alternatively, the processing system 1014 may be the entire UE (e.g., see 350 of FIG. 3).

In one configuration, the apparatus 902/902' for wireless communication includes means for determining an overlap in time between a first signal for a first cell and a second signal for a second cell, wherein the second cell includes at least one of a different numerology than the first cell or an asynchronous timing relative to the first cell and means for applying a beam prioritization rule for selecting a beam associated with the first signal of the first cell or the second signal of the second cell carrying information in separate beams. In one configuration, the apparatus may include means for receiving information from a second wireless device based on the selected beam. In one configuration, the apparatus may include means for transmitting information to a second wireless device based on the selected beam. In one configuration, the apparatus may include means for transmitting, to the second wireless device, a timing difference between the first cell and the second cell. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
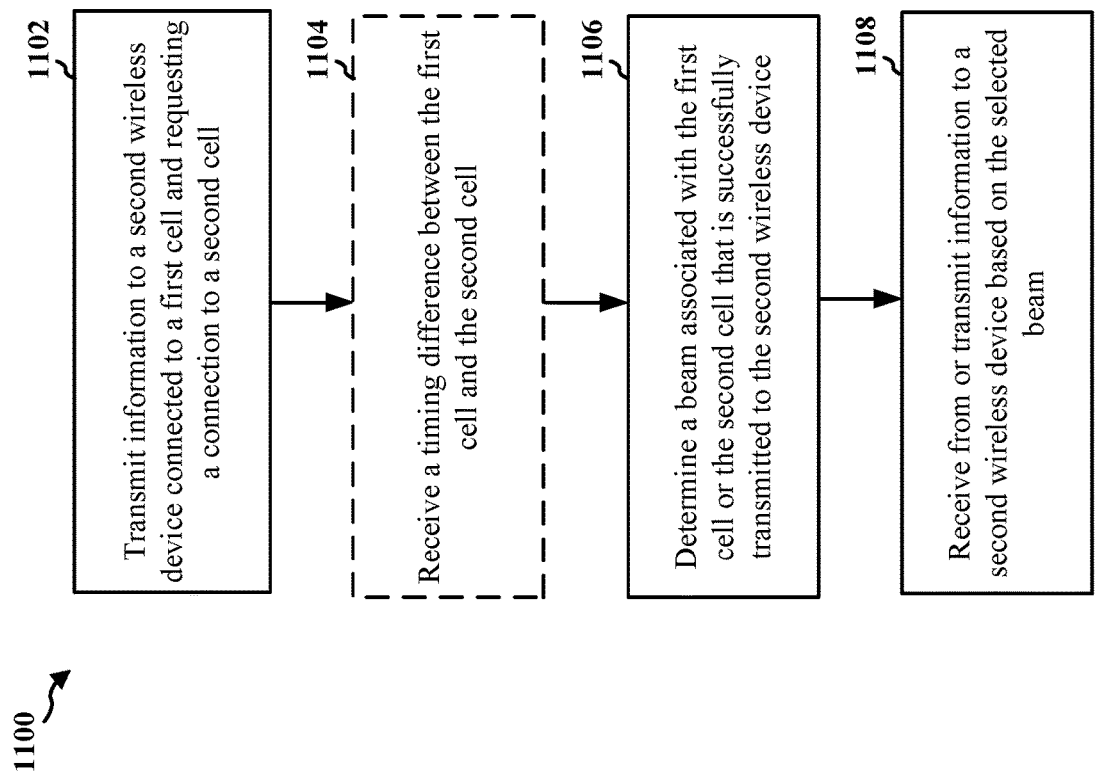
FIG. 11 is a flowchart of a method of wireless communication.

FIG. 11 is a flowchart 1100 of a method of wireless communication. The method may be performed by a first wireless device, such as a base station or a component of a base station (e.g., the base station 310, 402, 410, 602, 608, 704, 706, 708; the apparatus 1202/1202'; the processing system 1314, which may include the memory 376 and which may be the entire base station 310 or a component of the base station 310, such as the TX processor 316, the RX processor 370, and/or the controller/processor 375). Optional aspects are illustrated with a dashed line.

At 1102, the first wireless device transmits information to a second wireless device (e.g. a UE) connected to a first cell and requesting connection to a second cell. The second cell includes at least one of a different numerology than the first cell or an asynchronous timing to the first cell. The first cell and the second cell may be in different SCG. The first cell and the second cell may be in different MCG. The first cell and the second cell may be in a frequency range of at least 6 GHz, and the second wireless device may be connected to the first cell and the second cell during a make-before-break handover. The information may be transmitted, e.g., by the information component 1208 and/or the transmission component 1206 of the apparatus 1202 in FIG. 12. For example, referring to FIG. 7, the first wireless device may be a base station 708 which transmits information in the form of a handover connection setup 714 to a UE 702 which is connected to a first cell served by source base station 704 and which is requesting connection to a second cell served by target base station 706 in a MBB handover. The base station 708 may be, for example, a gNB-CU, while the source base station and target base station may be gNB-DUs of base station 708. Alternatively, the first wireless device may be a base station 402, 602, or 704 which transmits information 720 to the UE 702, or a base station 410, 608, or 706 which transmits information 724 to the UE 702. Referring to FIG. 6, the first and second cell may correspond to the first cell 606 and the second cell 610, respectively, and may be in different SCGs or MCGs as described above in FIG. 5.

At 1106, the first wireless device may determine a beam associated with one of the first cell and the second cell which is successfully transmitted to the second wireless device (e.g. the UE). The beam may be determined, e.g., by determination component 1210 of the apparatus 1202 in FIG. 12. The first wireless device may also determine a beam in response to determining an overlap in time between a first signal for a first cell and a second signal for a second cell, wherein the second cell includes at least one of a different numerology than the first cell or an asynchronous timing relative to the first cell, e.g., as described above at 802 of FIG. 8. The first wireless device may also select the beam in response to applying a beam prioritization rule for selecting the beam associated with the first signal of the first cell or the second signal of the second cell carrying information in separate beams, e.g., as described above at 806 of FIG. 8. For example, referring to FIG. 7, the base station 708 (or 704, 706) may determine a beam 734 which is successfully (or unsuccessfully) transmitted to the UE 702 from the beams 718, 722 which were simultaneously transmitted by the source base station 704 and the target base station 706, respectively. The base station may determine the beam 734, for example, based on applied beam prioritization rules (e.g. at 726). The base station may also determine the beam 734 based on a timing difference 732 received from the UE 702 (from which an overlap in time may be determined).

At 1108, the first wireless device may receive information from a second wireless device (e.g. the UE), or transmit information to the second wireless device, based on the selected beam. The beam may be selected based on the application of a beam priority rule, such as described in connection with 806 in FIG. 8 and with 1106 in FIG. 11. The information may be received or transmitted, e.g., by beam information component 1212 of the apparatus 1202 in FIG. 12. For example, referring to FIG. 7, the base station 704, 706, 708 may receive uplink information 738, 740, 742 in a beam 744, 746, 748 which has spatial relation to the beam 718, 722 selected by the UE 702 after the UE applies the beam prioritization rules 726. Similarly, the base station 704, 706, 708 may transmit downlink information in a beam to the UE 702.

At 1104, the first wireless device may receive, from the second wireless device (e.g. the UE), a timing difference between when downlink information is transmitted from the first cell and the second cell or when uplink information is received at the first cell and the second cell. The beam may be determined at 1106 based on the timing difference. The timing difference may be received, e.g., by the timing difference component 1214 of the apparatus 1202 in FIG. 12. For example, referring to FIG. 7, the base station 708 (and/or base station 704 and/or 706) may receive a timing difference 732 from the UE 702 for the base station(s) to determine which beam 734 (e.g. beam 718, 722) was successfully transmitted to the UE. The timing difference may be, for example, the difference in propagation delay between when information 720 was transmitted by base station 704 and received by UE 702 and when information 724 was transmitted by base station 706 and received by UE 702. For instance, if information 720 was transmitted by the base station 704 at symbol 0 and received by the UE at symbol 5, and if information 724 was transmitted by the base station 706 at symbol 1 and received by the UE at symbol 5, the propagation delay difference or timing difference between the two cells will be 1 symbol. Similarly on the uplink, the base station 708 (and/or base station 704 and/or 706) may receive from the UE 702 the timing difference between when information 738 was transmitted by the UE and received by base station 704 and when information 740 was transmitted by the UE and received by the base station 706.

Figure 12:
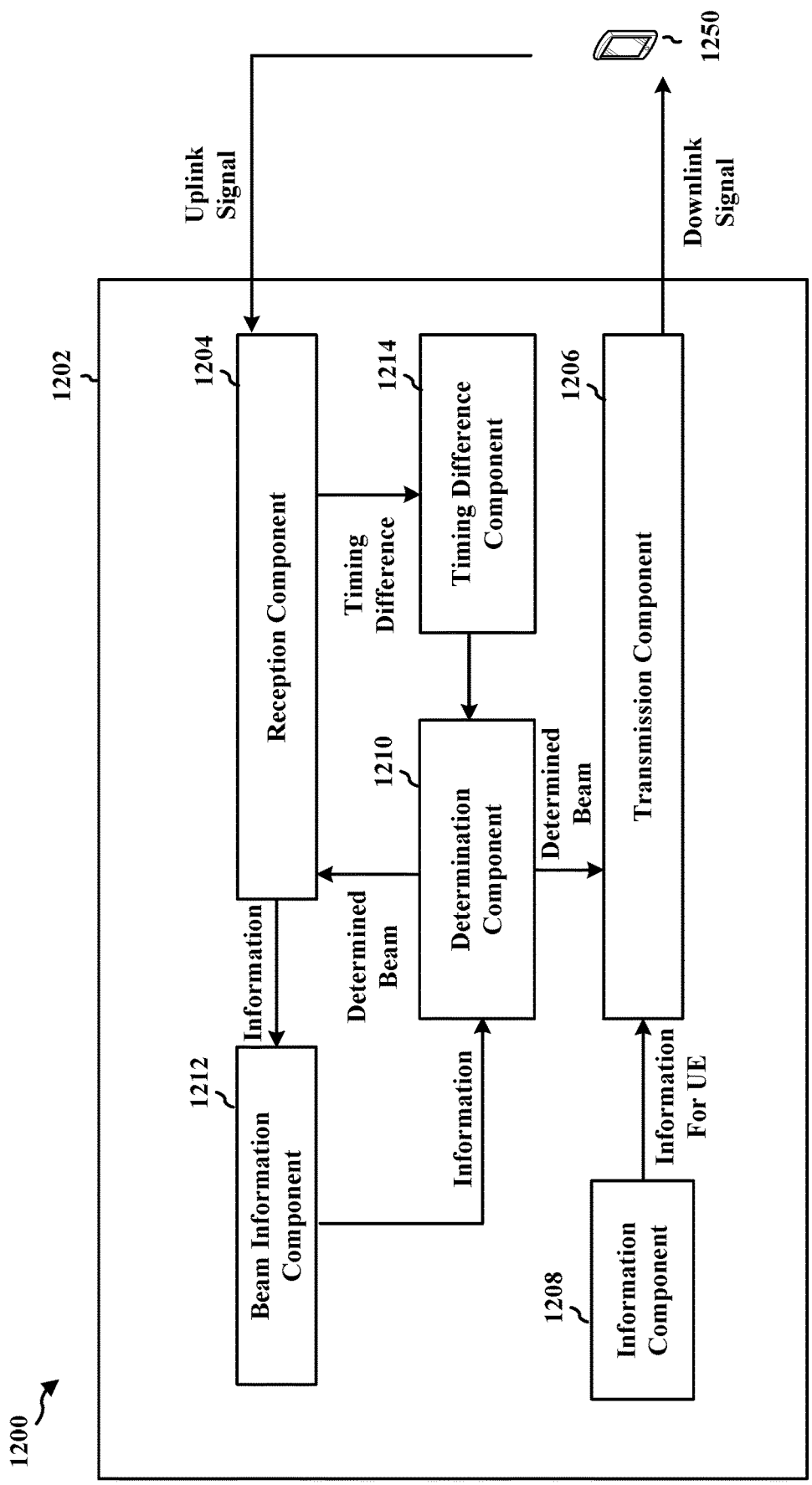
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a first wireless device, such as a base station or a component of a base station. The apparatus includes a reception component 1204 that receives uplink communication from a second wireless device, such as UE 1250, and a transmission component 1206 that transmits downlink communication to the second wireless device (e.g. UE 1250). The apparatus includes an information component 1208 configured to transmit information to the second wireless device (e.g. a UE) connected to a first cell and requesting connection to a second cell, e.g., as described in connection with 1102 in FIG. 11. The second cell includes at least one of a different numerology than the first cell or an asynchronous timing to the first cell. The apparatus includes a determination component 1210 configured to determine a beam associated with one of the first cell and the second cell which is successfully transmitted to the second wireless device, e.g., as described in connection with 1106 of FIG. 11. The determination component 1210 may determine the beam in response to determining an overlap in time between a first signal for a first cell and a second signal for a second cell, wherein the second cell includes at least one of a different numerology than the first cell or an asynchronous timing relative to the first cell, e.g., as described in connection with 802 of FIG. 8 and 1106 of FIG. 11. The determination component 1210 may also select the beam in response to applying a beam prioritization rule for selecting the beam associated with the first signal of the first cell or the second signal of the second cell carrying information in separate beams, e.g., as described above in connection with 806 of FIG. 8 and 1106 of FIG. 11. The apparatus includes a beam information component 1212 configured to receive information from the second wireless device (e.g. UE 1250), or to transmit information to the second wireless device, based on the selected beam, e.g., as described in connection with 1108 of FIG. 11. The apparatus includes a timing difference component 1214 configured to receive, from the second wireless device, a timing difference between when downlink information is transmitted from the first cell and the second cell or when uplink information is received at the first cell and the second cell, e.g., as described in connection with 1104 of FIG. 11. The beam may be determined by the determination component 1210 based on the timing difference.

The apparatus may include additional components that perform each of the blocks of the algorithm in the aforementioned flowcharts of FIGS. 7 and 11. As such, each block in the aforementioned flowcharts of FIGS. 7 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
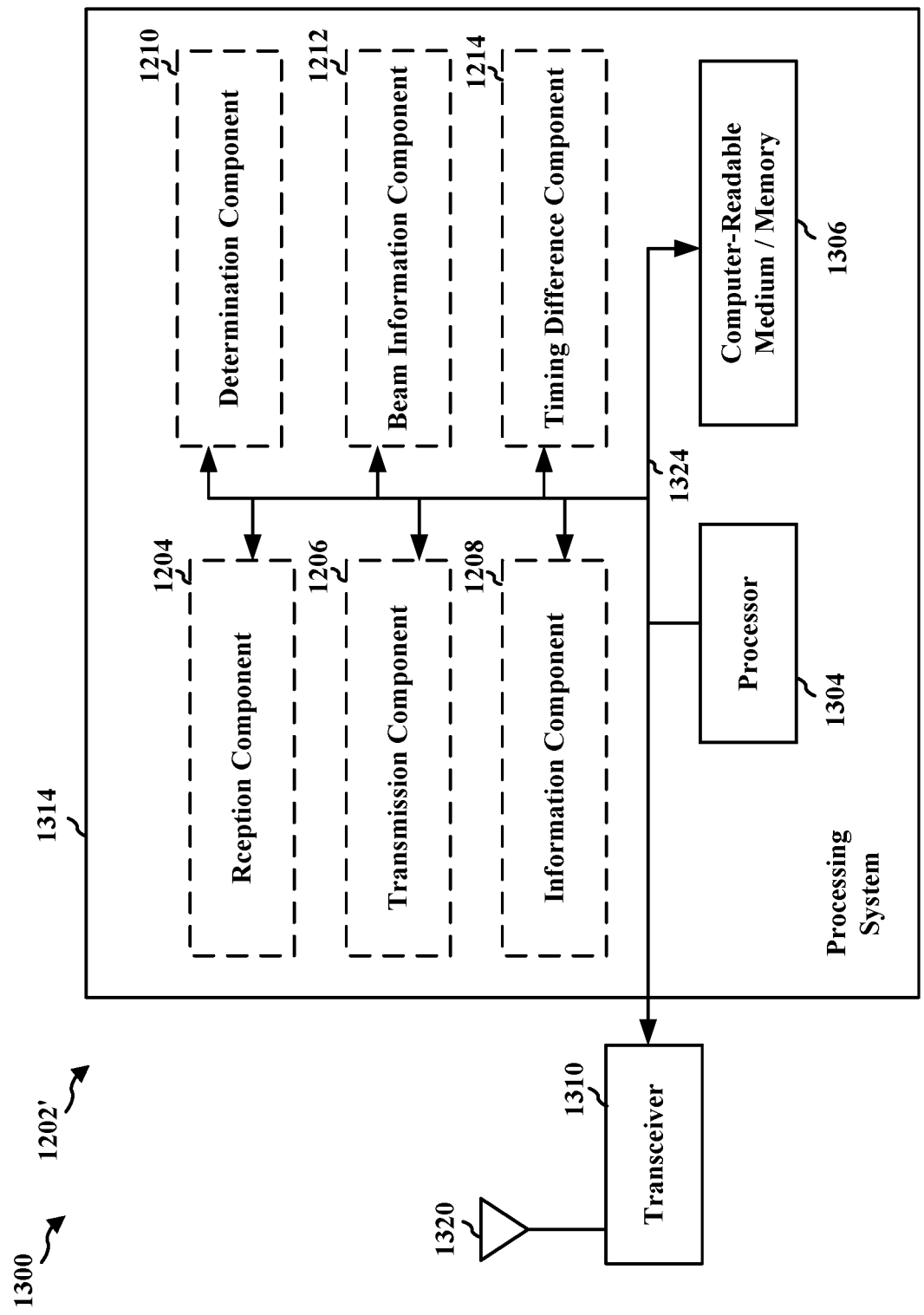
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375. Alternatively, the processing system 1314 may be the entire base station (e.g., see 310 of FIG. 3).

In one configuration, the apparatus 1202/1202' for wireless communication includes means for transmitting information to a second wireless device connected to a first cell and requesting connection to a second cell, wherein the second cell includes at least one of a different numerology than the first cell or is asynchronous to the first cell. In one configuration, the apparatus may include means for determining a beam associated with one of the first cell and the second cell which is successfully transmitted to the second wireless device. In one configuration, the apparatus may include means for determining an overlap in time between a first signal for a first cell and a second signal for a second cell, wherein the second cell includes at least one of a different numerology than the first cell or an asynchronous timing relative to the first cell, and means for applying a beam prioritization rule for selecting a beam associated with the first signal of the first cell or the second signal of the second cell carrying information in separate beams. In one configuration, the apparatus may include means for receiving information from the second wireless device based on the selected beam. In one configuration, the apparatus may include means for transmitting information to the second wireless device based on the selected beam. In one configuration, the apparatus may include means for receiving, from the second wireless device, a timing difference between when downlink information is transmitted from the first cell and the second cell or when uplink information is received at the first cell and the second cell, wherein the beam is determined based on the timing difference. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Example 1 is a method for wireless communication at a first wireless device, comprising: determining an overlap in time between a first signal for a first cell and a second signal for a second cell, wherein the second cell includes at least one of a different numerology than the first cell or an asynchronous timing relative to the first cell; applying a beam prioritization rule for selecting a beam associated with the first signal of the first cell or the second signal of the second cell carrying information in separate beams; and transmitting information to a second wireless device or receiving information from the second wireless device based on the selected beam.

Example 2 is the method of Example 1, wherein the beam prioritization rule is applied during each symbol or at each symbol boundary of one of the first cell or the second cell, and wherein the one of the first cell or the second cell comprises: a target cell, a source cell, the one of the first cell or the second cell having a longer symbol duration, the one of the first cell or the second cell having a shorter symbol duration, or a cell identified from one of a radio resource control (RRC) message or a medium access control (MAC) control element (MAC-CE).

Example 3 is the method of any of Examples 1 and 2, wherein the first wireless device is connected to the first cell and the second cell, wherein the second cell includes the different numerology than the first cell; and wherein the beam prioritization rule is applied during a symbol of one of the first cell or the second cell.

Example 4 is the method of any of Examples 1 to 3, wherein the beam prioritization rule is applied per symbol of one of the first cell or the second cell, and wherein the beam with a determined higher priority at a start of each symbol is used for the transmitting or the receiving during each symbol.

Example 5 is the method of any of Examples 1 to 4, wherein the first wireless device is connected to the first cell and the second cell, wherein the second cell is asynchronous to the first cell; and wherein the beam prioritization rule is applied at a symbol boundary of one of the first cell or the second cell.

Example 6 is the method of any of Examples 1 to 5, wherein the one of the first cell or the second cell comprises a cell associated with a current downlink or uplink communication.

Example 7 is the method of any of Examples 1 to 6, further comprising: refraining from applying the beam prioritization rule for partially aligned symbols of the first cell and the second cell.

Example 8 is the method of any of Examples 1 to 7, wherein the beam prioritization rule is applied per symbol boundary of one of the first cell or the second cell having a longer symbol duration, wherein the beam for the other of the first cell or the second cell includes higher priority at each shorter symbol boundary within the longer symbol duration, and wherein the beam for the other of the first cell or the second cell is used for the transmitting or the receiving at each shorter symbol boundary within the longer symbol duration.

Example 9 is the method of any of Examples 1 to 8, wherein the beam prioritization rule is applied for at least one of: simultaneous physical downlink control channel (PDCCH) beams, default physical downlink shared channel (PDSCH) beams, downlink channel beams including first reference signals, uplink channel beams including second reference signals, beams from the first cell and the second cell, or beams to the first cell and the second cell.

Example 10 is the method of any of Examples 1 to 9, wherein the second cell includes the different numerology than the first cell, and wherein the beam prioritization rule restricts the first wireless device from being simultaneously connected to the first cell and the second cell that have different numerology.

Example 11 is the method of any of Examples 1 to 10, wherein the second cell is asynchronous to the first cell, and wherein the beam prioritization rule restricts the first wireless device from being simultaneously connected to the first cell and the second cell if the second cell is asynchronous to the first cell.

Example 12 is the method of any of Examples 1 to 11, further comprising: transmitting, to the second wireless device, a timing difference between the first cell and the second cell, wherein the timing difference is for downlink communication or uplink communication.

Example 13 is the method of any of Examples 1 to 12, wherein the first wireless device is connected to the first cell and the second cell, the method further comprising: receiving a continuous transmission having a same beam indication for the one of the first cell or the second cell, wherein the beam prioritization rule is applied after the continuous transmission is received.

Example 14 is the method of any of Examples 1 to 13, further comprising: refraining from applying the beam prioritization rule during the continuous transmission.

Example 15 is the method of any of Examples 1 to 14, wherein the continuous transmission comprises at least one of: a control resource set (CORESET) or synchronization signal block (SSB) with a potential physical downlink control channel (PDCCH) transmission, a downlink signal associated with a decoded transmission configuration index (TCI) state, or an uplink signal associated with a decoded spatial relation for the uplink signal.

Example 16 is an apparatus for wireless communication at a first wireless device, comprising: a memory; and at least one processor coupled to the memory and configured to: determine an overlap in time between a first signal for a first cell and a second signal for a second cell, wherein the second cell includes at least one of a different numerology than the first cell or an asynchronous timing relative to the first cell; apply a beam prioritization rule for selecting a beam associated with the first signal of the first cell or the second signal of the second cell carrying information in separate beams; and transmit information to a second wireless device or receive information from the second wireless device based on the selected beam.

Example 17 is the apparatus of Example 16, wherein the beam prioritization rule is applied during each symbol or at each symbol boundary of one of the first cell or the second cell, and wherein the one of the first cell or the second cell comprises: a target cell, a source cell, the one of the first cell or the second cell having a longer symbol duration, the one of the first cell or the second cell having a shorter symbol duration, or a cell identified from one of a radio resource control (RRC) message or a medium access control (MAC) control element (MAC-CE).

Example 18 is the apparatus of Examples 16 or 17, wherein the first wireless device is connected to the first cell and the second cell, wherein the second cell includes the different numerology than the first cell; and wherein the beam prioritization rule is applied during a symbol of one of the first cell or the second cell.

Example 19 is the apparatus of any of Examples 16 to 18, wherein the first wireless device is connected to the first cell and the second cell, wherein the second cell is asynchronous to the first cell; and wherein the beam prioritization rule is applied at a symbol boundary of one of the first cell or the second cell.

Example 20 is the apparatus of any of Examples 16 to 19, wherein the one of the first cell or the second cell comprises a cell associated with a current downlink or uplink communication.

Example 21 is the apparatus of any of Examples 16 to 20, wherein the beam prioritization rule is applied for at least one of: simultaneous physical downlink control channel (PDCCH) beams, default physical downlink shared channel (PDSCH) beams, downlink channel beams including first reference signals, uplink channel beams including second reference signals, beams from the first cell and the second cell, or beams to the first cell and the second cell.

Example 22 is the apparatus of any of Examples 16 to 21, wherein the second cell includes the different numerology than the first cell, and wherein the beam prioritization rule restricts the first wireless device from being simultaneously connected to the first cell and the second cell that have different numerology.

Example 23 is the apparatus of any of Examples 16 to 22, wherein the second cell is asynchronous to the first cell, and wherein the beam prioritization rule restricts the first wireless device from being simultaneously connected to the first cell and the second cell if the second cell is asynchronous to the first cell.

Example 24 is the apparatus of any of Examples 16 to 23, wherein the at least one processor is further configured to: transmit, to the second wireless device, a timing difference between the first cell and the second cell, wherein the timing difference is for downlink communication or uplink communication.

Example 25 is the apparatus of any of Examples 16 to 24, wherein the first wireless device is connected to the first cell and the second cell, and the at least one processor is further configured to receive a continuous transmission having a same beam indication for the one of the first cell or the second cell, wherein the beam prioritization rule is applied after the continuous transmission is received.

Example 26 is the apparatus of any of Examples 16 to 25, wherein the at least one processor is further configured to refrain from applying the beam prioritization rule during the continuous transmission.

Example 27 is the apparatus of any of Examples 16 to 26, wherein the continuous transmission comprises at least one of: a control resource set (CORESET) or synchronization signal block (SSB) with a potential physical downlink control channel (PDCCH) transmission, a downlink signal associated with a decoded transmission configuration index (TCI) state, or an uplink signal associated with a decoded spatial relation for the uplink signal.

Example 28 is an apparatus for wireless communication at a first wireless device, comprising: means for determining an overlap in time between a first signal for a first cell and a second signal for a second cell, wherein the second cell includes at least one of a different numerology than the first cell or an asynchronous timing relative to the first cell; means for applying a beam prioritization rule for selecting a beam associated with the first signal of the first cell or the second signal of the second cell carrying information in separate beams; and means for transmitting information to a second wireless device, or means for receiving information from the second wireless device, based on the selected beam.

Example 29 is the apparatus of Example 28, wherein the means for transmitting is further configured to transmit, to the second wireless device, a timing difference between the first cell and the second cell, wherein the timing difference is for downlink communication or uplink communication.

Example 30 is a non-transitory computer-readable medium storing computer executable code for wireless communication at a first wireless device, the code when executed by a processor cause the processor to: determine an overlap in time between a first signal for a first cell and a second signal for a second cell, wherein the second cell includes at least one of a different numerology than the first cell or an asynchronous timing relative to the first cell; apply a beam prioritization rule for selecting a beam associated with the first signal of the first cell or the second signal of the second cell carrying information in separate beams; and transmit information to a second wireless device or receive information from the second wireless device based on the selected beam.

What is claimed is:

1. A method for wireless communication at a first wireless device, comprising:
    determining an overlap in time that would occur between a first signal on a first beam with the first wireless device for a first cell and a second signal on a second beam with the first wireless device for a second cell, wherein the second cell includes a different numerology than the first cell;
    applying a restriction of the first wireless device from being simultaneously connected to the first cell and the second cell, in response to the different numerology of the first cell and the second cell for which the overlap in time that would occur is identified, wherein the restriction is based on a beam prioritization rule that restricts the first wireless device from being simultaneously connected to the first cell and the second cell due to the different numerology, and wherein the beam prioritization rule is for selecting a beam associated with the first signal of the first cell or the second signal of the second cell carrying information for the first wireless device in separate beams; and
    transmitting the information to a second wireless device or receiving the information from the second wireless device based on the selected beam.

2. The method of claim 1, wherein the restriction is applied during each symbol or at each symbol boundary of one of the first cell or the second cell, and wherein the one of the first cell or the second cell comprises:
    a target cell,
    a source cell,
    the one of the first cell or the second cell having a longer symbol duration,
    the one of the first cell or the second cell having a shorter symbol duration, or
    a cell identified from one of a radio resource control (RRC) message or a medium access control (MAC) control element (MAC-CE).

3. The method of claim 1,
    wherein the restriction is applied during a symbol of one of the first cell or the second cell.

4. The method of claim 1, wherein the restriction is applied per symbol of one of the first cell or the second cell, and wherein the beam with a determined higher priority at a start of each symbol is used for the transmitting or the receiving during each symbol.

5. The method of claim 1,
    wherein the second cell is asynchronous to the first cell; and
    wherein the restriction is applied at a symbol boundary of one of the first cell or the second cell.

6. The method of claim 5, wherein the one of the first cell or the second cell comprises a cell associated with a current downlink or uplink communication.

7. The method of claim 1, wherein the restriction is applied per symbol boundary of one of the first cell or the second cell having a longer symbol duration, wherein the beam for the other of the first cell or the second cell includes higher priority at each shorter symbol boundary within the longer symbol duration, and wherein the beam for the other of the first cell or the second cell is used for the transmitting or the receiving at each shorter symbol boundary within the longer symbol duration.

8. The method of claim 1, wherein the restriction is applied for at least one of:
    simultaneous physical downlink control channel (PDCCH) beams,
    default physical downlink shared channel (PDSCH) beams,
    downlink channel beams including first reference signals,
    uplink channel beams including second reference signals,
    beams from the first cell and the second cell, or
    beams to the first cell and the second cell.

9. The method of claim 1, further comprising:
    transmitting, to the second wireless device, a timing difference between the first cell and the second cell, wherein the timing difference is for downlink communication or uplink communication.

10. The method of claim 1, further comprising:
    receiving a continuous transmission having a same beam indication for the one of the first cell or the second cell, wherein the restriction is applied after the continuous transmission is received.

11. The method of claim 10, wherein the continuous transmission comprises at least one of:
    a control resource set (CORESET) or synchronization signal block (SSB) with a potential physical downlink control channel (PDCCH) transmission,
    a downlink signal associated with a decoded transmission configuration index (TCI) state, or
    an uplink signal associated with a decoded spatial relation for the uplink signal.

12. An apparatus for wireless communication at a first wireless device, comprising:
    at least one memory; and
    at least one processor coupled to the at least one memory and configured to:
        determine an overlap in time that would occur between a first signal one a first beam with the first wireless device for a first cell and a second signal on a second beam with the first wireless device for a second cell, wherein the second cell includes a different numerology than the first cell;
        apply a restriction of the first wireless device from being simultaneously connected to the first cell and the second cell, in response to the different numerology of the first cell and the second cell for which the overlap in time that would occur is identified, wherein the restriction is based on a beam prioritization rule that restricts the first wireless device from being simultaneously connected to the first cell and the second cell due to the different numerology, and wherein the beam prioritization rule is for selecting a beam associated with the first signal of the first cell or the second signal of the second cell carrying information for the first wireless device in separate beams; and transmit the information to a second wireless device or receive the information from the second wireless device based on the selected beam.

13. The apparatus of claim 12, wherein the restriction is applied during each symbol or at each symbol boundary of one of the first cell or the second cell, and wherein the one of the first cell or the second cell comprises:
a target cell,
a source cell,
the one of the first cell or the second cell having a longer symbol duration,
the one of the first cell or the second cell having a shorter symbol duration, or
a cell identified from one of a radio resource control (RRC) message or a medium access control (MAC) control element (MAC-CE).

14. The apparatus of claim 12,
wherein the restriction is applied during a symbol of one of the first cell or the second cell.

15. The apparatus of claim 12,
wherein the second cell is asynchronous to the first cell; and
wherein the restriction is applied at a symbol boundary of one of the first cell or the second cell.

16. The apparatus of claim 15, wherein the one of the first cell or the second cell comprises a cell associated with a current downlink or uplink communication.

17. The apparatus of claim 12, wherein the restriction is applied for at least one of:
simultaneous physical downlink control channel (PDCCH) beams,
default physical downlink shared channel (PDSCH) beams,
downlink channel beams including first reference signals,
uplink channel beams including second reference signals,
beams from the first cell and the second cell, or
beams to the first cell and the second cell.

18. The apparatus of claim 12, wherein the at least one processor is further configured to:
transmit, to the second wireless device, a timing difference between the first cell and the second cell, wherein the timing difference is for downlink communication or uplink communication.

19. The apparatus of claim 12, wherein the at least one processor is further configured to receive a continuous transmission having a same beam indication for the one of the first cell or the second cell, wherein the restriction is applied after the continuous transmission is received.

20. The apparatus of claim 19, wherein the continuous transmission comprises at least one of:
a control resource set (CORESET) or synchronization signal block (SSB) with a potential physical downlink control channel (PDCCH) transmission,
a downlink signal associated with a decoded transmission configuration index (TCI) state, or
an uplink signal associated with a decoded spatial relation for the uplink signal.

21. An apparatus for wireless communication at a first wireless device, comprising:
means for determining an overlap in time that would occur between a first signal on a first beam with the first wireless device for a first cell and a second signal on a second beam with the first wireless device for a second cell, wherein the second cell includes a different numerology than the first cell;
means for applying a restriction of the first wireless device from being simultaneously connected to the first cell and the second cell, in response to the different numerology of the first cell and the second cell for which the overlap in time that would occur is identified, wherein the restriction is based on a beam prioritization rule that restricts the first wireless device from being simultaneously connected to the first cell and the second cell due to the different numerology, and wherein the beam prioritization rule is for selecting a beam associated with the first signal of the first cell or the second signal of the second cell carrying information for the first wireless device in separate beams; and
means for transmitting the information to a second wireless device, or means for receiving the information from the second wireless device, based on the selected beam.

22. The apparatus of claim 21, wherein the means for transmitting is further configured to transmit, to the second wireless device, a timing difference between the first cell and the second cell, wherein the timing difference is for downlink communication or uplink communication.

23. A non-transitory computer-readable medium storing computer executable code for wireless communication at a first wireless device, the code when executed by a processor cause the processor to:
determine an overlap in time that would occur between a first signal on a first beam with the first wireless device for a first cell and a second signal on a second beam with the first wireless device for a second cell, wherein the second cell includes a different numerology than the first cell;
apply a restriction of the first wireless device from being simultaneously connected to the first cell and the second cell, in response to the different numerology of the first cell and the second cell for which the overlap in time that would occur is identified, wherein the restriction is based on a beam prioritization rule that restricts the first wireless device from being simultaneously connected to the first cell and the second cell due to the different numerology, and wherein the beam prioritization rule is for selecting a beam associated with the first signal of the first cell or the second signal of the second cell carrying information for the first wireless device in separate beams; and
transmit the information to a second wireless device or receive the information from the second wireless device based on the selected beam.

\* \* \* \* \*